US010710909B2

(12) United States Patent
Inanaga et al.

(10) Patent No.: US 10,710,909 B2
(45) Date of Patent: Jul. 14, 2020

(54) PULSE DISCHARGE POWER SUPPLY AND PULSE DISCHARGE GENERATING METHOD

(71) Applicants: Mitsubishi Electric Corporation, Chiyoda-ku (JP); Nagaoka University of Technology, Nagaoka-shi (JP)

(72) Inventors: Yasutaka Inanaga, Tokyo (JP); Teruki Naito, Tokyo (JP); Gaku Oinuma, Tokyo (JP); Weihua Jiang, Nagaoka (JP)

(73) Assignees: Mitsubishi Electric Corporation, Chiyoda-ku (JP); Nagaoka University of Technology, Nagaoka-shi (JP)

( * ) Notice: Subject to any disclaimer, the term of this patent is extended or adjusted under 35 U.S.C. 154(b) by 0 days.

(21) Appl. No.: 16/323,833

(22) PCT Filed: Sep. 8, 2016

(86) PCT No.: PCT/JP2016/076435
§ 371 (c)(1),
(2) Date: Feb. 7, 2019

(87) PCT Pub. No.: WO2018/047271
PCT Pub. Date: Mar. 15, 2018

(65) Prior Publication Data
US 2019/0210896 A1 Jul. 11, 2019

(51) Int. Cl.
*B01D 53/00* (2006.01)
*C02F 1/46* (2006.01)
(Continued)

(52) U.S. Cl.
CPC .......... *C02F 1/4608* (2013.01); *B01D 53/00* (2013.01); *B01J 19/08* (2013.01); *B01J 19/088* (2013.01);
(Continued)

(58) Field of Classification Search
CPC .............. C02F 1/4608; C02F 2305/023; C02F 2201/46175; C02F 2201/4614;
(Continued)

(56) References Cited

U.S. PATENT DOCUMENTS 3,366,564 A * 1/1968 Merton ...................... A61L 2/02
210/748.01
4,458,153 A * 7/1984 Wesley ...................... A61L 2/02
250/435
(Continued)

FOREIGN PATENT DOCUMENTS

CN 1275538 A 12/2000
JP 4-222 A 1/1992
(Continued)

OTHER PUBLICATIONS

International Search Report dated Oct. 25, 2016 in PCT/JP2016/076435 filed on Sep. 8, 2016.
(Continued)

*Primary Examiner* — Joseph W Drodge
(74) *Attorney, Agent, or Firm* — Oblon, McClelland, Maier & Neustadt, L.L.P.

(57) ABSTRACT

One of the purposes is to provide a pulse discharge power supply for use in generating pulse discharge. The pulse discharge power supply includes a pulse generation unit, a control circuit, an electric current detector and an electric current signal processing unit. The pulse generation unit generates a first pulse, and applies it to a discharge load for generating pulse discharge. The electric current detector detects an electric current flowing into the discharge load in accordance with the application of the pulse. The electric current signal processing unit outputs into the control circuit a signal based on an integration result of the electric current having been detected. The control circuit controls the gen-
(Continued)

eration of a second pulse in the pulse generation unit based on the signal being received.

16 Claims, 15 Drawing Sheets

(51) Int. Cl.
*B01J 19/08* (2006.01)
*H01T 19/00* (2006.01)

(52) U.S. Cl.
CPC ....... *H01T 19/00* (2013.01); *B01J 2219/0875* (2013.01); *B01J 2219/0877* (2013.01); *C02F 2201/4614* (2013.01); *C02F 2201/46135* (2013.01); *C02F 2201/46175* (2013.01); *C02F 2305/023* (2013.01)

(58) Field of Classification Search
CPC .. C02F 2201/46135; C02F 1/008; C02F 1/46; C02F 1/461; C02F 1/46104; C02F 1/487; B01J 19/08; B01J 2219/0875; B01J 2219/0877; B01J 19/088; B01J 19/087; B01J 2219/0801; B01J 2219/0803; B01J 2219/0805; H01T 19/00; B01D 53/00; G01R 19/04; G01R 19/145; G01R 19/15; G01R 19/155; G01R 19/165; G01R 19/16528; G01R 19/16533; G01R 19/16538; G01R 19/25; G01R 22/00; G01R 22/10; G01R 29/00; G01R 29/02
USPC ............ 210/143, 243, 748.01, 748.17; 204/228.1, 230.1, 230.8, 555, 556, 661, 204/663; 324/76.39; 340/657, 659, 660, 340/664

See application file for complete search history.

(56) References Cited

U.S. PATENT DOCUMENTS

| | | | | |
|---|---|---|---|---|
| 5,328,574 A | * | 7/1994 | Mercier | ................ C02F 1/4602 204/229.3 |
| 6,325,916 B1 | * | 12/2001 | Lambert | ............. C02F 1/46114 205/751 |
| 6,358,398 B1 | | 3/2002 | Halldorson et al. | |
| 2002/0076370 A1 | * | 6/2002 | Wong | ........................ A61L 2/03 422/186.12 |
| 2004/0251213 A1 | * | 12/2004 | Bradley | ................. C02F 1/463 205/676 |
| 2006/0094095 A1 | * | 5/2006 | Mueller-Hartmann | ..................... A61N 1/0412 435/173.6 |
| 2010/0051463 A1 | * | 3/2010 | Kostrzewa | .......... C02F 1/46104 204/556 |
| 2011/0089848 A1 | * | 4/2011 | Ohsawa | ............. H05B 41/2887 315/246 |
| 2018/0134591 A1 | | 5/2018 | Oinuma et al. | |

FOREIGN PATENT DOCUMENTS

| | | |
|---|---|---|
| JP | 6-67517 A | 3/1994 |
| JP | 2002-177734 A | 6/2002 |
| JP | 2003-270288 A | 9/2003 |
| JP | 5819031 B1 | 11/2015 |

OTHER PUBLICATIONS

Jiang, W. et al., "Pulsed Power Generation by Solid-State LTD," IEEE Transactions on Plasma Science, vol. 42, No. 11, Nov. 2014, pp. 3603-3608.
Written Opinion of the International Searching Authority dated Oct. 25, 2016 in corresponding PCT Application No. PCT/JP2016/076435 (5 pages).
Chinese Office Action dated Apr. 29, 2020 in Patent Application No. 201680088840.5 with machine translation.

* cited by examiner

PULSE DISCHARGE POWER SUPPLY AND PULSE DISCHARGE GENERATING METHOD

TECHNICAL FIELD

The present invention relates to a pulse discharge power supply used for generating pulse discharge, and to a pulse discharge generating method therefor.

BACKGROUND ART

An electric discharge treatment technology is known in which a chemical substance (s) is treated by generating electric discharge within a predetermined space. In the field of water treatment, an electric discharge treatment technology is under consideration in which a decomposition resistance substance (s) is removed with a high degree of efficiency by directly operating hydroxyl radicals produced by electric discharge on water to be treated.

Patent Document 1 proposes a water treatment apparatus using an electric discharge treatment technology. The water treatment apparatus of Patent Document 1 includes a reaction-vessel or reactor having therein inclined plates for flowing down treatment target water, treatment means in hierarchical structure having electrodes each for generating electric discharge thereacross to perform treatment by radicals produced by electric discharge with respect to the treatment target water, and a pulse discharge power-supply means for applying a short-pulse high-voltage with respect to the electrodes. In a system using the water treatment apparatus of Patent Document 1, it becomes possible to decompose decomposition resistance substances dissolved in water by utilizing radicals produced by means of streamer discharge.

Patent Document 2 proposes an exhaust gas treatment apparatus using an electric discharge treatment technology. A purification apparatus of Patent Document 2 includes a casing having electrodes for generating electric discharge thereacross for performing treatment by radicals produced by electric discharge with respect to a treatment target gas(es), and a high-voltage very short pulse power-supply with respect to the electrodes for applying a high voltage. In a system using the purification apparatus of Patent Document 2, it becomes possible to decompose gas-state contaminated substances by means of corona discharge.

In the electric discharge treatment technologies described above, electric discharge is generated by applying a voltage across the electrodes using a pulse discharge power supply. In accordance with the electric discharge being generated, radicals of ozone (O3), hydroxyl radicals (OH radicals) or the like are produced. By giving rise to the reaction of radicals being produced with a substance(s) to be treated, the treatment for decomposing the substance(s) to be treated is carried out. In a case in which treatment efficiency of a substance to be treated is increased by using an electric discharge treatment technology, an appropriate support measure is conceivable in which, in order to achieve increasing the amount of supply of radicals into the substance to be treated, a voltage being applied from a pulse discharge power supply is raised so that electric power being entered is increased. While on the other hand, an appropriate support measure is conceivable in which a repetition frequency of pulse discharge is raised so that the entered electric power is increased.

RELATED ART DOCUMENTS

Patent Documents

[Patent Document 1] Japanese Patent Publication No. 5819031
[Patent Document 2] Japanese Laid-Open Patent Publication No. 2002-177734

SUMMARY OF THE INVENTION

Problems to be Solved by the Invention

However, when electric power entered from a pulse discharge power supply is increased, the increase of electric discharge power density can easily be caused. When the electric discharge power density increases, it becomes easy to cause transition from uniform discharge of streamer discharge, corona discharge or the like to local discharge of arc discharge, spark discharge or the like. When local discharge occurs due to the transition of electric discharge, there arises a fear in which a substance(s) to be treated that is not treated yet results in increasing, because electric discharge which is approximately homogeneously distributed cannot be formed in the entirety of a desired space. Namely, when the electric power is increased by raising a voltage being applied from a pulse discharge power supply or a pulse repetition frequency thereof, there arises a fear in which it becomes easy to cause transition to local discharge, so that a substance(s) to be treated is not treated, whereby treatment efficiency is lowered.

When local discharge occurs which exceeds beyond a certain frequency, it becomes necessary to halt the electric discharge in order to avoid a further occurrence of local discharge and to recover uniform discharge which is approximately distributed as a homogeneous one. During a time-duration when the electric discharge is halted, the substance(s) to be treated cannot be treated. For this reason, an occurrence of local discharge incurs resulting in further lowering treatment efficiency.

The present invention has been accomplished in view of those conditions as described above, and an object of the invention is to provide a pulse discharge power supply for suppressing an occurrence of local discharge, and a pulse discharge generating method therefor.

Means for Solving the Problems

A pulse discharge power supply in one aspect of the present invention is a pulse discharge power supply in which pulse discharge is introduced by outputting a voltage pulse for a plurality of times to a discharge load being a target of the pulse discharge; and the power supply comprises: a pulse generation unit for outputting a first voltage pulse, and for outputting a second voltage pulse after outputting the first voltage pulse; and a control circuit for controlling an output of a second voltage pulse based on an integration value of an electric current flowing into the discharge load with respect to the first voltage pulse.

A pulse discharge generating method in one aspect of the present invention is a pulse discharge generating method in which pulse discharge is generated by outputting a voltage pulse for a plurality of times from a pulse discharge power supply to a discharge load being a target of the pulse discharge; and the method comprises: a step of outputting a first voltage pulse from the pulse discharge power supply to the discharge load; a step of outputting a second voltage pulse from the pulse discharge power supply to the discharge load after outputting the first voltage pulse; a step of calculating an integration value of an electric current flowing into the discharge load with respect to the first voltage pulse; and a step of controlling an output of a second voltage pulse based on the integration value.

Effects of the Invention

According to a pulse discharge power supply and a pulse discharge generating method in one aspect of the present invention, an occurrence of local discharge can be suppressed in an electric discharge treatment technology.

EMBODIMENTS FOR CARRYING OUT THE INVENTION

Figure 1:
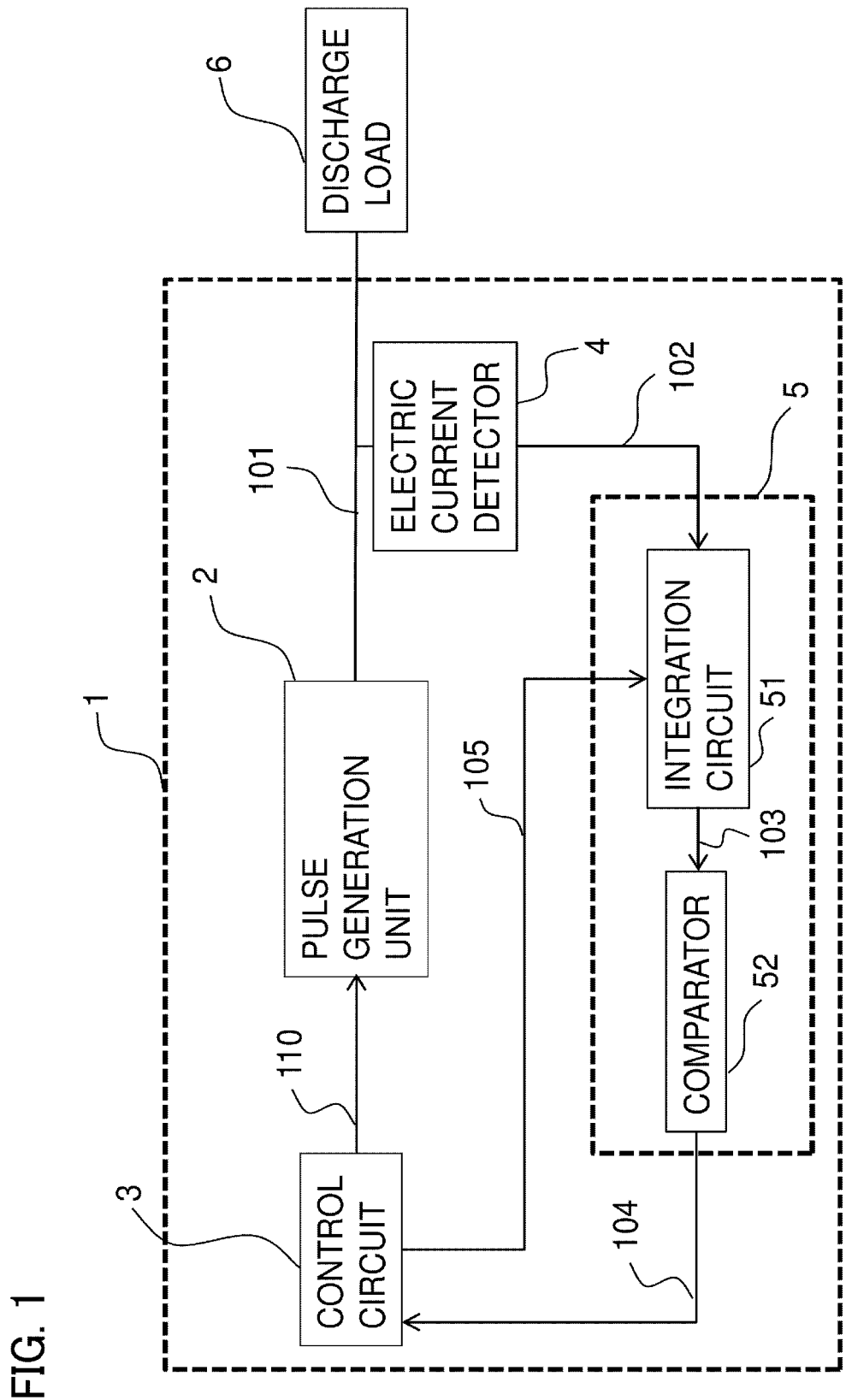
FIG. 1 is a block diagram illustrating an example of configuration of a pulse discharge power supply according to Embodiment 1.

Hereinafter, the explanation will be made in more detail referring to the drawings for the embodiments of a pulse discharge power supply and a pulse discharge generating method which are disclosed in the present invention. The pulse discharge power supply in the present invention includes four kinds of main constituent elements of a pulse generation unit, a control circuit, an electric current detector and a discharge signal processing unit, and is connected to an external discharge load. It should be noted that the embodiments described below are each examples, and that the present invention is not limited to those embodiments.

Embodiment 1

FIG. 1 is a block diagram illustrating an example of configuration of a pulse discharge power supply 1 according to Embodiment 1. The pulse discharge power supply 1 illustrated in FIG. 1 includes a pulse generation unit 2, a control circuit 3, an electric current detector 4 and a discharge signal processing unit 5; and the pulse discharge power supply 1 is connected to an external discharge load 6.

The pulse generation unit 2 is connected to the control circuit 3 and to the discharge load 6, and the unit generates a pulse. The pulse generation unit 2 receives a pulse ON-signal 110 in which the control circuit 3 produces, and generates a high voltage pulse 101 based on the pulse ON-signal 110 being received, so that the high voltage pulse 101 being generated is outputted into the discharge load 6. The pulse generation unit 2 is made of, for example, a capacitor discharging circuit connecting a switch(s) thereto, a pulse forming line, a capacitance transfer-type circuit, a magnetic pulse compressor circuit, a Marx generator or circuit, and so forth.

The control circuit 3 controls the constituent elements of the pulse discharge power supply 1 including the pulse generation unit 2, the electric current detector 4 and the discharge signal processing unit 5, and contributes to achieve a function in which the pulse discharge power supply 1 suppresses an occurrence of local discharge. For example, the control circuit 3 connects pulse generation unit 2 and the discharge signal processing unit 5, and performs the control of the pulse discharge power supply 1. The control circuit 3 produces, for generating a pulse, a first pulse ON-signal 110, and outputs it into the pulse generation unit 2.

In addition, the control circuit 3 produces, in advance of the production of the first pulse ON-signal 110, a first integration preparation instruction 105 for starting a preparation to carryout integration, and outputs the instruction into the discharge signal processing unit 5. After having outputted the first pulse ON-signal 110, the control circuit 3 receives from the discharge signal processing unit 5 an arc detection signal 104 related to transition detection of an arc being an example of local discharge. When the arc detection signal 104 is received from the discharge signal processing unit 5, the control circuit 3 produces a next pulse ON-signal 110 based on the arc detection signal 104 having been received, and outputs the next pulse ON-signal 110 being produced into pulse generation unit 2.

Moreover, the control circuit 3 produces a next integration preparation instruction 105 in advance of the production of a next pulse ON-signal 110, and outputs the next integration preparation instruction 105 being produced into the discharge signal processing unit 5. According to the configuration described above, the control circuit 3 is enabled to output the pulse ON-signal 110 continually for a plurality of times.

Furthermore, the control circuit 3 changes, based on the arc detection signal 104 from the discharge signal processing unit 5, output situation of the pulse ON-signal 110, and suppresses an occurrence of local discharge such as an arc. To be specific, the control circuit 3 reduces a voltage applied across the discharge load 6, and suppresses an occurrence of local discharge. It is possible to make the control circuit 3 by, for example, an analog circuit and/or a general purpose logic IC(s); however, it is more desirable that the control circuit is made of a digital signal processing circuit constituted of an ASIC, a FPGA, a DSP and the like.

The electric current detector 4 is connected between the pulse generation unit 2 and the discharge load 6, and performs the detection of an electric current flowing into the discharge load 6. In addition, the electric current detector 4 is also connected to the discharge signal processing unit 5. To be specific, the electric current detector 4 performs the detection of an electric current flowing between the pulse generation unit 2 and the discharge load 6, and outputs, based on a detection result, an electric current monitoring signal 102 indicating an electric current value into the discharge signal processing unit 5. The electric current detector 4 being, for example, an electric current transducer, a Rogowski coil and the like can output corresponding to a frequency band of an electric current of a high voltage pulse(s), and performs the output in accordance with the change in the electric current.

The discharge signal processing unit 5 includes an integration circuit 51 and a comparator 52, and is connected to the control circuit 3 and to the electric current detector 4. The discharge signal processing unit 5 performs the integration with respect to the electric current that the electric current detector 4 detects. When the integration circuit 51 receives the integration preparation instruction 105 from the control circuit 3, the integration circuit 51 resets an integration result taking on up to this time, and performs the preparation to carry out a new integration process. When the integration circuit 51 receives the electric current monitoring signal 102 from the electric current detector 4, the integration circuit 51 performs the integration of an electric current based on the electric current monitoring signal 102 having been received, and outputs an integration result into the comparator 52 as an integrated output 103. When the comparator 52 receives the integrated output 103, the comparator outputs, based on the integrated output 103 having been received, the arc detection signal 104 related to the detection of arc transition into the control circuit 3.

The discharge load 6 is connected to the pulse generation unit 2, and carries out the treatment by means of electric discharge. To be specific, electric discharge is generated based on the high voltage pulse 101 received from the pulse generation unit 2. The discharge load 6 produces radicals by way of electric discharge. The radicals being produced are used for the treatment such as water treatment, exhaust gas treatment, and so forth. As for the discharge load 6, also included for example is a reaction-vessel or reactor for performing treatment of a hazardous gas (es) by using radicals produced by means of gas discharge, a reactor for performing the purification of water by introducing water to be treated into a system and by acting on the water with the aforementioned radicals and, a reactor in which the aforementioned radicals are acted with components of a gas (es), a liquid(s) and a solid object(s) in the reactor where produced matter therein due to chemical reactions with those components is utilized, or the like.

In the discharge load 6, when a voltage applied from the pulse discharge power supply is raised or when a pulse repetition frequency is raised, electric discharge power density increases, so that it becomes easy to cause transition from approximately uniform discharge such as streamer discharge, corona discharge and the like to local discharge such as arc discharge, spark discharge and the like. When transition to local discharge occurs, there arises a fear in which treatment efficiency using electric discharge in the discharge load 6 is lowered.

Here, "approximately uniform discharge" means that, with respect to one or a plurality of electric discharge electrodes placed within a discharge load, electric power density per an electrode's area is approximately homogeneous.

In addition, when transition to local discharge occurs which exceeds beyond a certain frequency, there arises a fear in which the electric discharge results in a halt in order to avoid a further occurrence of local discharge and to recover uniform discharge which is approximately distributed as a homogeneous one. When an electric discharge halt is caused, treatment efficiency is further lowered. A "frequency of transition to local discharge" means a ratio in which transition to local discharge occurs in relation to a plurality of high voltage pulses within a predetermined time-duration.

Figure 2:
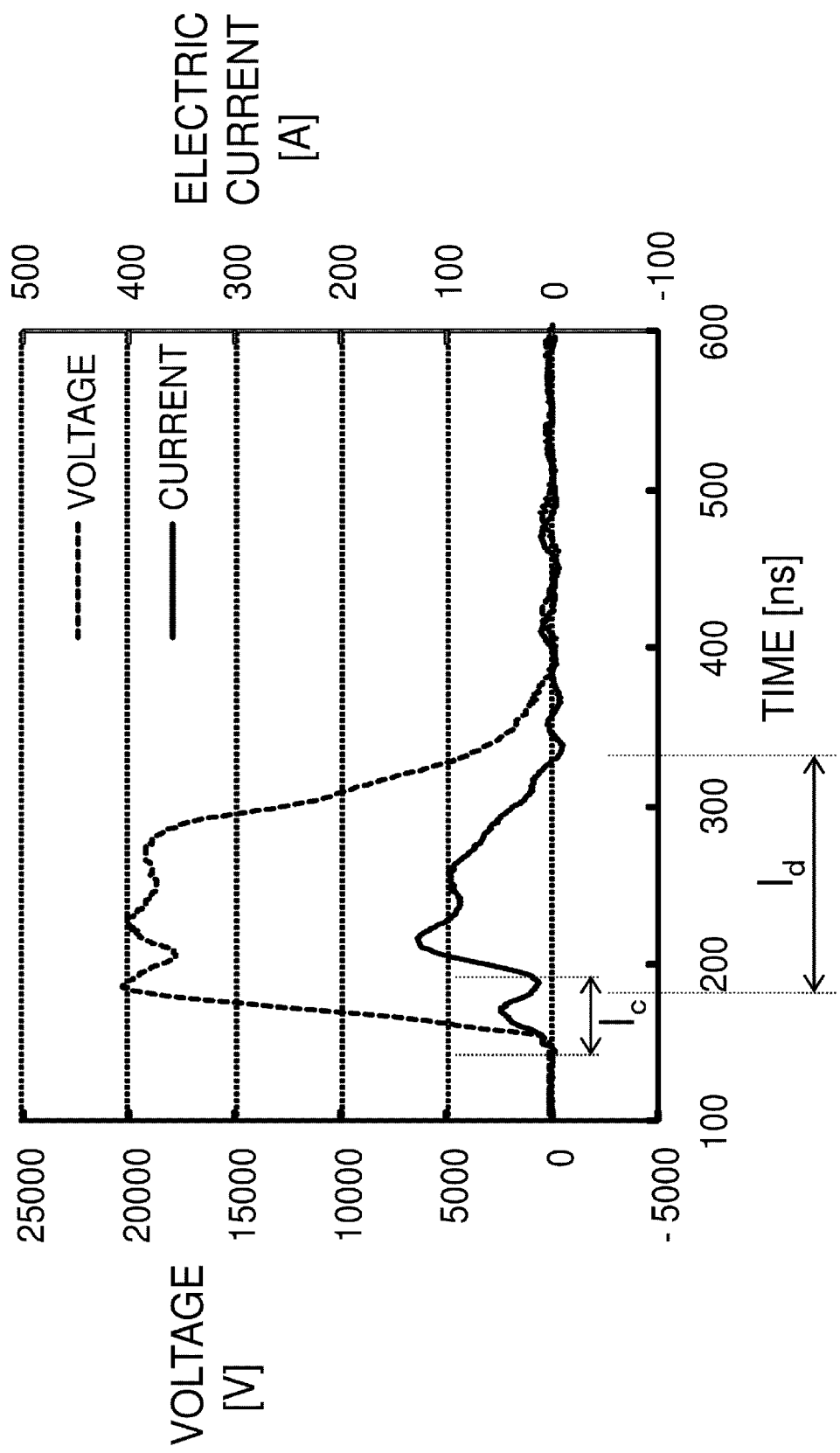
FIG. 2 is a diagram of electric current and voltage waveforms showing an example of the relationship between an electric current value and a voltage value with respect to a discharge load according to Embodiment 1.

FIG. 2 is a diagram of electric current and voltage waveforms showing an example of the relationship (in particular, time-varying relationship) between an electric current value and a voltage value with respect to the discharge load 6 according to Embodiment 1. To be specific, the example shows variations of an electric current value and a voltage value with respect to time passage after the pulse discharge power supply 1 starts its operations. In FIG. 2, the broken line indicates a value of a voltage applied to the discharge load 6, and the solid line indicates a value of an electric current flowing into the discharge load 6.

In the one example of FIG. 2, transition to local discharge does not occur. With timing of about 150 nanoseconds to about 200 nanoseconds after the pulse discharge power supply 1 starts its operations, the application of the high voltage pulse 101 outputted from the pulse generation unit 2 is started with respect to the discharge load 6. By giving rise to the application of the high voltage pulse 101 to the discharge load 6, a voltage value of the discharge load 6 sharply increases from about 0 V to about 20000 V between about 150 nanoseconds and about 200 nanoseconds. After having sharply increased, the voltage value being increased continues the state of about 20000 V until about 300 nanoseconds, and then sharply decreases between about 300 nanoseconds and about 400 nanoseconds to reach about 0 V.

Meanwhile, as for an electric current value, one first peak appears between about 150 nanoseconds and about 200 nanoseconds due to the increase and decrease of the electric current. After the first peak, the electric current value decreases toward about 0 A; from then on with respect to the electric current value, a second peak appears between about 200 nanoseconds and about 250 nanoseconds due to the increase and decrease of the electric current. After the second peak, the electric current value decreases toward about 100 A; from then on, the electric current value decreases between about 250 nanoseconds and about 350 nanoseconds while following a gradual third peak, and then reaches about 0 A.

In the one example of FIG. 2, an electric current between about 150 nanoseconds and about 200 nanoseconds is referred to as a displacement current Ic. In the displacement current Ic, the first peak of the electric current in accordance with the application of the high voltage pulse 101 is included. After the displacement current Ic corresponding to the quantity of capacitance of the discharge load 6 flows, the second peak and the third peak appear due to electric discharge in the discharge load 6. An electric current between about 180 nanoseconds and about 350 nanoseconds including the second peak and the third peak is referred to as a discharge current Id. The discharge current Id is an electric current in accordance with ordinary discharge in the discharge load 6, and means an electric current in accordance with uniform discharge which is approximately distributed as a homogeneous one such as streamer discharge, corona discharge, and the like.

When ordinary discharge is used, it becomes possible to achieve the irradiation of radicals which are approximately homogeneous. For this reason, a configuration using ordinary discharge is made effective also for water treatment in which homogeneous treatment is demanded.

Figure 3:
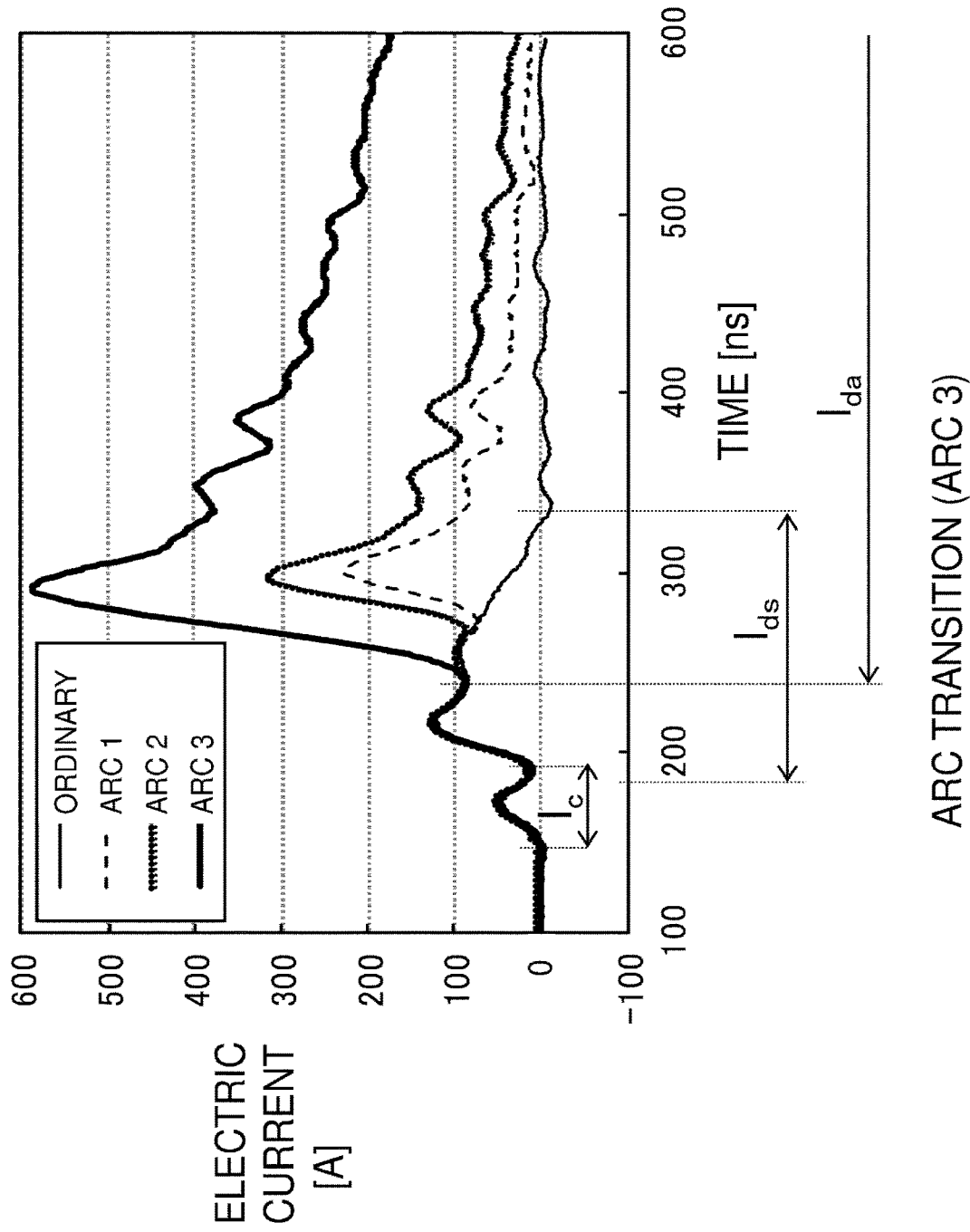
FIG. 3 is a diagram of electric current waveforms showing an example of changes in electric current values in a case of ordinary discharge caused in the discharge load according to Embodiment 1, and in cases of which arc transition occurs in the discharge load.

FIG. 3 is a diagram of electric current waveforms showing an example of changes in electric current values in cases of which arc transition occurs in the discharge load 6 according to Embodiment 1, and those shown for the comparison in a case of ordinary discharge caused in the discharge load. In FIG. 3, an example of electric current value's transitive changes in ordinary discharge in accordance with time passage is shown for use as a reference. And then, by overlapping on the example of electric current value's transitive changes in the ordinary discharge, three examples of electric current value's transitive changes are shown in cases of which arc transition occurs.

In FIG. 3, in a case of ordinary discharge, one first peak appears between about 150 nanoseconds and about 200 nanoseconds due to the increase and decrease in electric current values of the discharge load 6 similarly to the case of FIG. 2, so that a displacement current Ic is observed. After the first peak, the electric current value decreases toward about 0 A; from then on, a second peak appears between about 200 nanoseconds and about 250 nanoseconds due to the increase and decrease in electric current values of the discharge load 6, and a gradual third peak appears between about 250 nanoseconds and about 350 nanoseconds. The electric current value decreases down to about 0 A in vicinity to about 350 nanoseconds. Streamer discharge being uniform discharge is generated between about 180 nanoseconds and about 300 nanoseconds, so that a discharge current (streamer discharge's current Ids) appears.

On the other hand, in a case of Arc 1 which is an example of the transition to an arc being local discharge, one first peak similarly appears between about 150 nanoseconds and about 200 nanoseconds due to the increase and decrease in electric current values of the discharge load 6 as shown in FIG. 3, so that a displacement current Ic is observed. After the first peak, the electric current value decreases toward about 0 A; from then on, a second peak similarly appears between about 200 nanoseconds and about 250 nanoseconds due to the increase and decrease in electric current values of the discharge load 6, and a gradual third peak, between about 250 nanoseconds and about 350 nanoseconds.

However, after the third peak and before the electric current value decreases down to about 0 A, a fourth peak exceeding about 200 A appears between about 250 nanoseconds and about 350 nanoseconds. Namely in Arc 1, arc transition occurs between about 250 and about 300 nanoseconds, so that an arc is caused. An electric current in which an arc discharge is caused after the arc transition occurs is referred to as an "arc current" (arc discharge current Ida). In the case of Arc 1, almost all of the electric currents from about 300 nanoseconds onward are made of an arc current.

In addition, in a case of Arc 2 which is another example of the transition to an arc, one first peak similarly appears between about 150 nanoseconds and about 200 nanoseconds due to the increase and decrease in electric current values of the discharge load 6 as shown in FIG. 3, so that a displacement current Ic is observed. After the first peak, the electric current value decreases down to about 0 A; from then on, a second peak similarly appears between about 200 nanoseconds and about 250 nanoseconds due to the increase and decrease in electric current values of the discharge load 6, and a gradual third peak, between about 250 nanoseconds and about 350 nanoseconds.

However, after the third peak and before the electric current value decreases down to about 0 A, a fourth peak exceeding about 300 A appears between about 250 nanoseconds and about 350 nanoseconds. In Arc 2, arc transition occurs in a time duration between about 250 and about 300 nanoseconds which is earlier than that in the case of Arc 1, so that an arc is caused. Also in the case of Arc 2, almost all of the electric currents from about 300 nanoseconds onward are made of an arc current.

Moreover, in a case of Arc 3 which is yet another example of the transition to an arc, one first peak similarly appears between about 150 nanoseconds and about 200 nanoseconds due to the increase and decrease in electric current values of the discharge load 6 as shown in FIG. 3, so that a displacement current Ic is observed. After the first peak, the electric current value decreases down to about 0 A; from then on, a second peak similarly appears between about 200 nanoseconds and about 250 nanoseconds due to the increase and decrease in electric current values of the discharge load 6.

However, after the second peak and before the electric current value decreases down to about 0 A, a third peak exceeding about 500 A appears between about 230 nanoseconds and about 350 nanoseconds. In Arc 3, arc transition occurs in a time duration between about 230 nanoseconds and about 260 nanoseconds which is earlier than those in the cases of Arc 1 and Arc 2, so that an arc is caused. Also in the case of Arc 3, almost all of the electric currents from about 300 nanoseconds onward are made of an arc current similarly to those of Arc 1 and Arc 2.

Ordinary discharge in which the discharge load 6 performs is formed, for example, in a case of streamer discharge, through coronas in course of the process of transient electric discharge formation. Even when streamers are made through coronas so that ordinary discharge is formed, there exists a sufficient possibility that the transition occurs from the streamers to an arc in accordance with the increase of electric current value, the increase of electric power density, and the like.

The transition to an arc does not basically occur at early timings when the high voltage pulse 101 is applied as shown in FIG. 2 and FIG. 3. The transition to an arc occurs en route after passing through streamers by way of coronas. To be specific, it can be known that an in-between displacement current Ic including the first peak from about 150 nanoseconds to about 200 nanoseconds is similar to an in-between electric current including the second peak from about 200 nanoseconds to about 230 nanoseconds in the case of ordinary discharge and also in the cases of Arcs 1 through 3, and that the arc transitions do not occur until about the 230 nanoseconds.

In Arcs 1 through 3 shown in FIG. 3, the arc transition occurs from about 230 nanoseconds onward, so that arc discharge is caused. When ordinary discharge which is approximately homogeneously distributed has changed to arc discharge being local discharge, there arises a fear in which a substance(s) to be treated that is not treated yet results in increasing, because electric discharge which is homogeneously distributed cannot be formed in the entirety of a desired space. In a case of the increase of the substance (s) to be treated that is not treated yet, treatment efficiency is lowered. In order to restrict arc transition, it is adequate that the voltage is reduced to an application voltage in which arc transition does not occur. For dealing therewith, the pulse discharge power supply 1 according to Embodiment 1 suppresses an occurrence of local discharge by means of the restriction of arc transition which focuses on an electric current's integration value.

Here, the explanation will be made for a reason why an electric current's integration value is focused on. In general, when arc transition occurs, an electric discharge's impedance is significantly reduced in a local area where the arc transition occurs. Meanwhile, when consideration is given to a discharge load having a large-scale electric discharge area in its entirety, for example, such as a water treatment apparatus, an electric current value at the time of ordinary discharge in which arc transition does not occur is also large, so that an electric discharge's impedance in the entirety of the load becomes sufficiently small. For this reason, even when arc transition occurs in a local area so that impedance reduction is caused, the change becomes relatively small, when a usual discharge impedance in the entirety of the load is sufficiently low. Because a change in voltage outputted from the pulse generation unit 2 responds to an impedance variation, the change becomes similarly small, so that highly accurate detection of arc transition becomes difficult at a voltage value.

The same also applies to an electric current value; even when arc transition occurs in a local area so that electric current density of the local area increases, a change of the electric current value becomes small because an electric current value of ordinary discharge in the entirety of the load is large. Hence, the accuracy of arc transition detection is lowered.

Meanwhile, in the pulse discharge in the 100 nanoseconds region, arc transition occurs in a final stage where pulse application is performed, so that significant increase in an electric current's integration value is observed in the final stage of pulse application, and therefore, a high degree of accuracy in arc detection can be achieved by means of a method for detecting a change of the integration value.

Figure 4A:
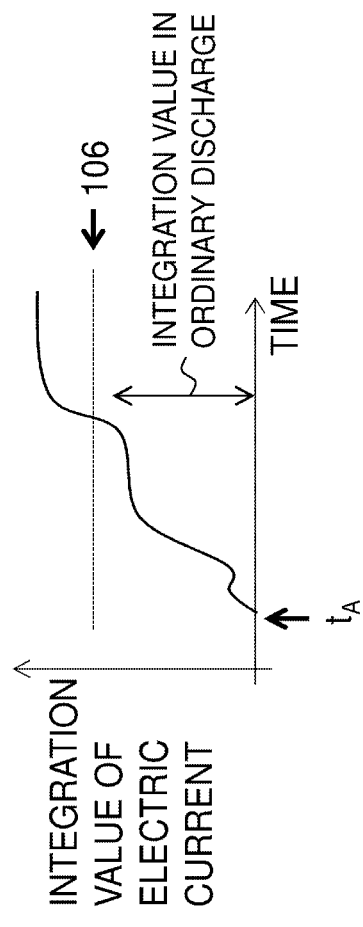
FIGS. 4A, 4B and 4C are illustrative diagrams for explaining the relationship between an electric current's integration value and time when arc transition occurs.
Figure 4B:
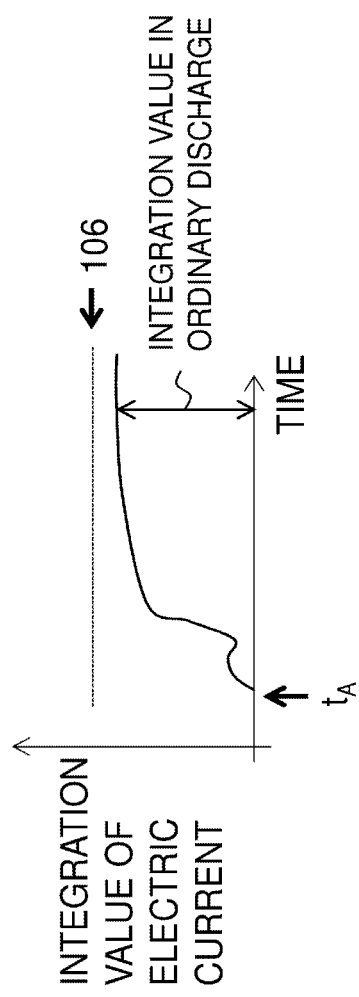
Figure 4C:
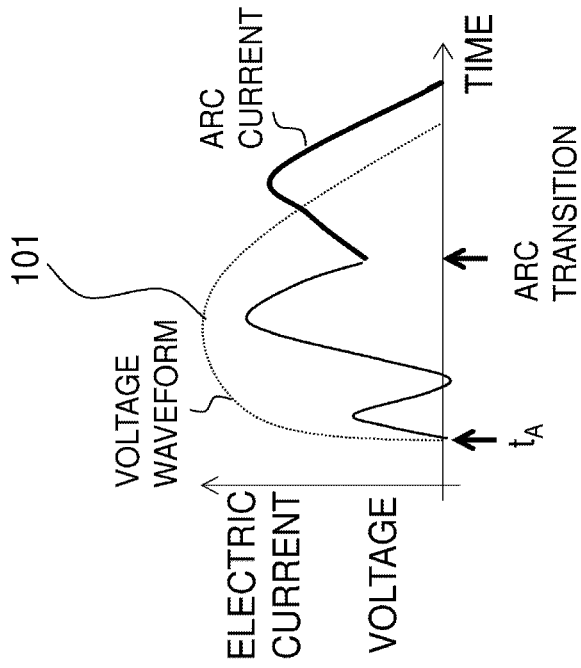

FIGS. 4A, 4B and 4C are illustrative diagrams for explaining the relationship between an electric current's integration value and time when arc transition occurs. When the discharge signal processing unit 5 receives the integration preparation instruction 105 sent from the control circuit 3 (at a time before the time $t_A$ of FIG. 4A), the discharge signal processing unit firstly resets an integration process performed until that time. The integration circuit 51 of the discharge signal processing unit 5 integrates an electric current value having been detected by the electric current detector 4, after the resetting, from the time $t_A$ of FIG. 4A, and outputs an integration result into the comparator 52 as the integrated output 103. Note that, in FIG. 4A, the vertical axis indicates levels of an electric current and a voltage, and the horizontal axis indicates time. In addition, the solid-line curve indicates an electric current, and the dotted-line curve indicates a voltage.

The comparator 52 includes an arc-transition determination criterion value 106 (in FIGS. 4B and 4C, simply indicated as "106") which becomes a reference or criterion whether or not a possibility in which arc transition occurs is high. The arc-transition determination criterion value 106 is set based on a preliminarily induced experimental result or the like of arc transition. The comparator 52 compares an electric current's integration value indicated by the integrated output 103 with the arc-transition determination criterion value 106, and outputs a comparison result into the control circuit 3 as the arc detection signal 104.

The pulse discharge power supply 1 according to Embodiment 1 performs the control for suppressing arc discharge based on an integration value of an electric current detected by the electric current detector 4. To be specific, in a case in which the arc detection signal 104 having been outputted from the comparator 52 indicates that the integration value exceeds the arc-transition determination criterion value 106 (for example, in the case as illustrated in FIG. 4B), the control circuit 3 performs the control for reducing a voltage applied across the discharge load 6. In a case in which the arc detection signal 104 having been outputted from the comparator 52 indicates that the integration value does not exceed the arc-transition determination criterion value 106 (for example, in the case as illustrated in FIG. 4C), the control circuit 3 performs the control for holding a voltage applied across the discharge load 6, and for efficiently continuing ordinary discharge.

Figure 5:
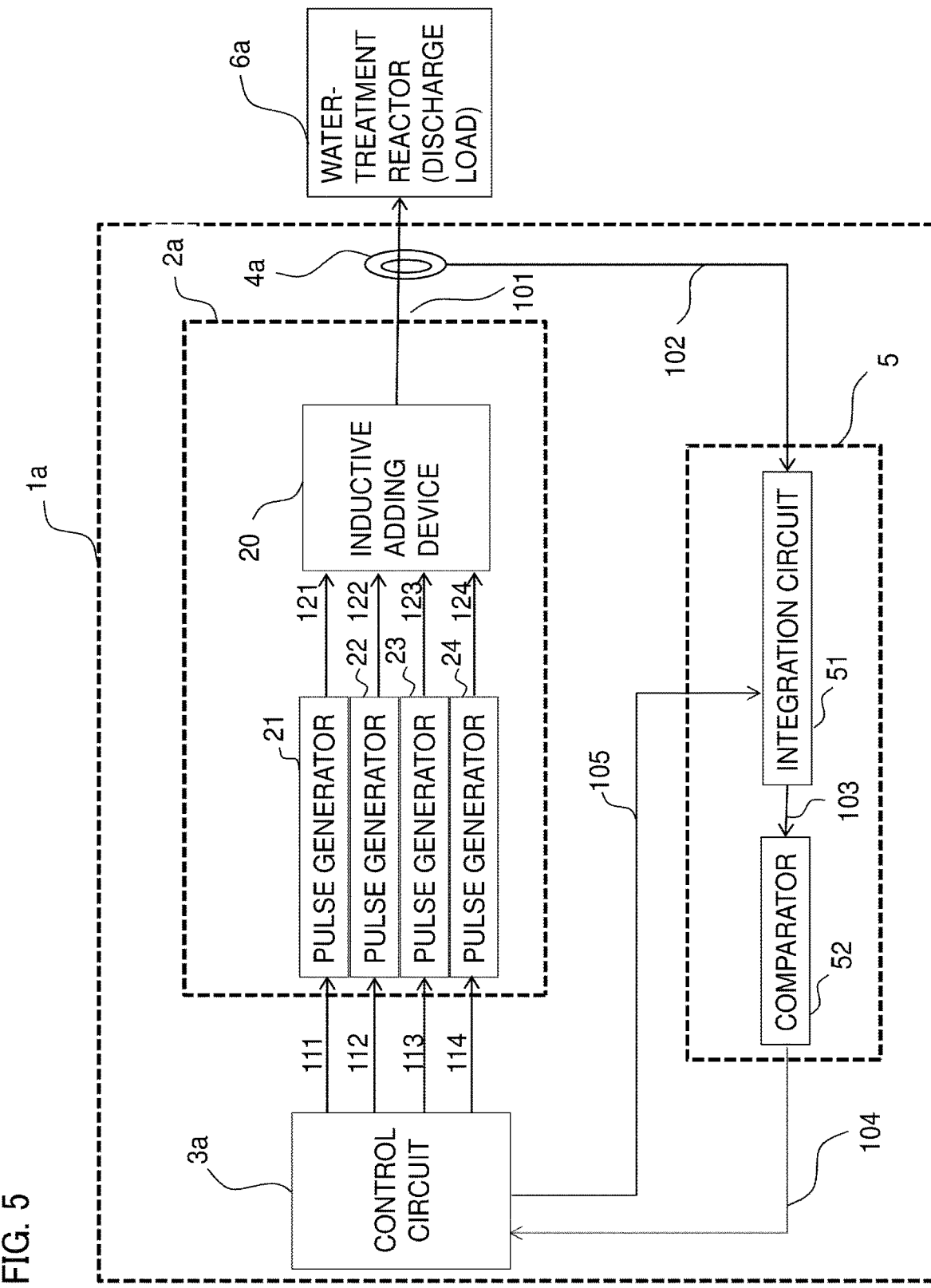
FIG. 5 is a block diagram illustrating another example of configuration of a pulse discharge power supply according to Embodiment 1.

FIG. 5 is a block diagram illustrating another example of configuration of the pulse discharge power supply 1 according to Embodiment 1. A pulse discharge power supply 1a illustrated in the figure is a pulse discharge power supply of an inductive voltage adding method as an example. An inductive voltage adding method is a method to perform a superposed voltage output in which outputs of a plurality of pulse generators are inductively coupled with one another by the formation of a transformer by means of a magnetic core and a central conductor. In FIG. 5, an example of performing superposition of four high voltage pulses is illustrated as a plurality of high voltage pulses being superposed (hereinafter, a unit of the number of the superposed high voltage pulses is referred to as a "stage").

The control circuit 3 of FIG. 5 produces pulse ON-signals 111 through 114 in four stages, and outputs into a pulse generation unit 2a. The pulse generation unit 2a of FIG. 5 includes an inductive adding device 20, and four-stage pulse generators 21 through 24 arranged in parallel with one another. The pulse generators 21 through 24 output into the inductive adding device 20 single stage pulses 121 through 124 being outputs of the pulse generator, respectively. The inductive adding device 20 receives the single stage pulses 121 through 124 outputted from the respective pulse generators 21 through 24, and inductively performs superposition of the single stage pulses.

The pulse discharge power supply 1a of FIG. 5 utilizes a current transformer 4a as the electric current detector 4. In addition, the pulse discharge power supply 1a of FIG. 5 utilizes a water-treatment reaction-vessel or reactor 6a as a discharge load, and detects an electric current between the water-treatment reactor 6a and the inductive adding device 20 by means of the current transformer 4a. The current transformer 4a produces, based on a detection result, the electric current monitoring signal 102, and outputs it into the integration circuit 51 of the discharge signal processing unit 5.

Next, the explanation will be made for the operations of the pulse discharge power supply 1a of FIG. 5 (the figure shows an example of a pulse discharge power supply of an inductive voltage adding method). The control circuit 3 produces a first pulse ON-signal 111 with respect to the pulse generator 21 when a predetermined condition(s) is satisfied, and outputs the pulse ON-signal into the pulse generator 21. The control circuit 3 produces, in synchronization with the production of the pulse ON-signal 111, a first pulse ON-signal 112 with respect to the pulse generator 22, and outputs the pulse ON-signal into the pulse generator 22.

The control circuit 3 also produces, in synchronization with the production of the pulse ON-signal 111, a first pulse ON-signal 113 with respect to the pulse generator 23, and outputs the pulse ON-signal into the pulse generator 23.

The control circuit 3 also produces, in synchronization with the production of the pulse ON-signal 111, a first pulse ON-signal 114 with respect to the pulse generator 24, and outputs the pulse ON-signal into the pulse generator 24.

The control circuit 3 further produces the integration preparation instruction 105 for resetting an integration result taking on up to this time in advance of the production of the pulse ON-signal 111, and outputs the integration preparation instruction into the integration circuit 51.

The pulse generator 21 receives the pulse ON-signal 111 outputted from the control circuit 3, and generates the single stage pulse 121 being an output from the pulse generator, which is outputted into the inductive adding device 20. Similarly, the pulse generator 22 receives the pulse ON-signal 112, and generates the single stage pulse 122, which is outputted into the inductive adding device 20. Similarly, the pulse generator 23 receives the pulse ON-signal 113, and generates the single stage pulse 123, which is outputted into the inductive adding device 20. Similarly, the pulse generator 24 receives the pulse ON-signal 114, and generates the single stage pulse 124, which is outputted into the inductive adding device 20. Namely, the pulse generators 21 through 24 are independently controlled on one another.

The inductive adding device 20 generates one high voltage pulse 101 by additively performing superposition of the single stage pulses 121 through 124 being outputted in synchronization with one another from the pulse generators 21 through 24, respectively. In addition, the inductive adding device 20 applies across electrodes (not shown in the figures) of the water-treatment reactor 6a the one high voltage pulse 101 having been generated.

In the water-treatment reactor 6a, charged particle density increases through ionization processes of neutral gases and electron multiplier processes thereof in accordance with voltage changes of the high voltage pulse 101 being applied by means of the inductive adding device 20, so that electric discharge is formed. In the electric discharge, radicals having high reactivity are produced according to collision processes of electrons and gases. The water-treatment reactor 6a performs a water treatment reaction by providing radicals being produced to water. In response to electric discharge being generated, an electric current value of the water-treatment reactor 6a varies, so that an electric current value between the inductive adding device 20 and the water-treatment reactor 6a also varies.

The current transformer 4a monitors an electric current value between the inductive adding device 20 and the water-treatment reactor 6a. The current transformer 4a produces, based on a monitoring result, the electric current monitoring signal 102 relating to an electric current value of the water-treatment reactor 6a. The current transformer 4a outputs the electric current monitoring signal 102 being produced into the discharge signal processing unit 5.

An electric current value in which the current transformer 4a monitors varies depending on discharge situation in the water-treatment reactor 6a. Namely, the current transformer 4a outputs the electric current monitoring signal 102 indicating discharge situation in the water-treatment reactor 6a into the discharge signal processing unit 5.

As described above, when the discharge signal processing unit 5 receives the integration preparation instruction 105 outputted from the control circuit 3, the discharge signal processing unit resets an integration process. The discharge signal processing unit 5 in which the integration process has been reset starts an integration process of an electric current based on a received electric current monitoring signal 102 when the electric current monitoring signal 102 outputted from the current transformer 4a is received, and outputs an integration result into the comparator 52 as the integrated output 103.

The arc-transition determination criterion value 106 in which the comparator 52 of the discharge signal processing unit 5 stores is set by referring to a preliminary experimental result or the like, and by adding the tolerance that gives consideration to variations of an integration signal value in an ordinary current in which arc transition does not occur.

In addition, it is more desirable that, as for the arc-transition determination criterion value 106, a different (small) and yet another arc-transition determination criterion value 106 is stored so that it corresponds to a case in which a voltage value of the high voltage pulse 101 is reduced by altering the number of stages of the pulse generators 21 through 24, and determination is performed in response to the number of operation stages of the pulse generators 21 through 24.

The comparator 52 compares, with the arc-transition determination criterion value 106 being stored, an integration value of an electric current into the discharge load where the integrated output 103 outputted from the integration circuit 51 indicates. The comparator 52 outputs, based on a comparison result, the arc detection signal 104 related to arc detection into the control circuit 3.

When an electric current's integration value reaches the arc-transition determination criterion value 106 or more, arc transition actually occurs; however, situation is conceivable in which an electric discharge halt is not yet required because arc discharge does not still exceed a certain frequency, and also situation is conceivable in which an electric discharge halt is required because arc discharge exceeds a certain frequency. When the electric current's integration value takes on the arc-transition determination criterion value 106 or more, the comparator 52 outputs the arc detection signal 104 for restricting arc transition into the control circuit 3, based on the electric current monitoring signal 102 being received.

Here, the arc detection signal 104 outputted toward the control circuit 3 takes on the arc detection signal 104 corresponding to the first pulse ON-signals 111 through 114 which have been produced by the control circuit 3 with respect to each of the pulse generators 21 through 24.

When an electric current's integration value is smaller than the arc-transition determination criterion value 106, a possibility in which arc transition occurs is low in the following high voltage pulse 101. For this reason, the comparator 52 does not output the arc detection signal 104 into the control circuit 3, when the electric current's integration value is smaller than the arc-transition determination criterion value 106.

The control circuit 3 receives the arc detection signal 104 corresponding to the first pulse ON-signals 111 through 114. Until that point of time, the control circuit 3 records the number of reception events of the arc detection signal 104, and, when the number of reception events (the frequency of events of arc transition) within a predetermined time-duration is in excess of a predetermined value, the control circuit 3 outputs the integration preparation instruction 105 into the discharge signal processing unit 5, but does not output next pulse ON-signals 111 through 114, so that an electric discharge halt is carried out.

On the other hand, when the number of reception events (the frequency of events of arc transition) within a predetermined time-duration is not in excess of a predetermined value, the control circuit 3 outputs a new integration preparation instruction 105 into the discharge signal processing unit 5, and produces, in accordance with the arc detection signal 104, the next pulse ON-signals 111 through 114, which are outputted in synchronization with one another into the pulse generators 21 through 24.

To be specific, when the control circuit 3 does not receive the arc detection signal 104 with respect to the discharge load 6*a*, the control circuit outputs a new integration preparation instruction 105 into the discharge signal processing unit 5, and also produces the next pulse ON-signals 111 through 114 and outputs them into the pulse generators 21 through 24 so as to introduce the high voltage pulse 101 similar to that at the times of the first pulse ON-signals 111 through 114, respectively.

When the frequency of events of arc transition is in excess of a predetermined value and when an electric discharge halt is carried out, the control circuit 3 outputs a new integration preparation instruction 105 into the discharge signal processing unit 5; however, the control circuit does not output next pulse ON-signals 111 through 114 into the pulse generators 21 through 24.

When the frequency of events of arc transition is not in excess of a predetermined value so that an electric discharge halt is not yet reached and when the control circuit 3 receives the arc detection signal 104 for restricting arc transition, the control circuit 3 outputs a new integration preparation instruction 105 into the discharge signal processing unit 5, and also generates the next pulse ON-signals 111 through 114 which introduce the high voltage pulse 101 whose voltage value is reduced than that of the high voltage pulse 101 at the times of the first pulse ON-signals 111 through 114; and the control circuit outputs the aforementioned next pulse ON-signals into the pulse generators 21 through 24, respectively. At the time of introducing the high voltage pulse 101 whose voltage value is reduced than that of the high voltage pulse 101 at the times of the first pulse ON-signals 111 through 114, the control circuit 3 performs a waveform control of the high voltage pulse 101, and suppresses an occurrence of local discharge such as an arc or the like.

Figure 6:
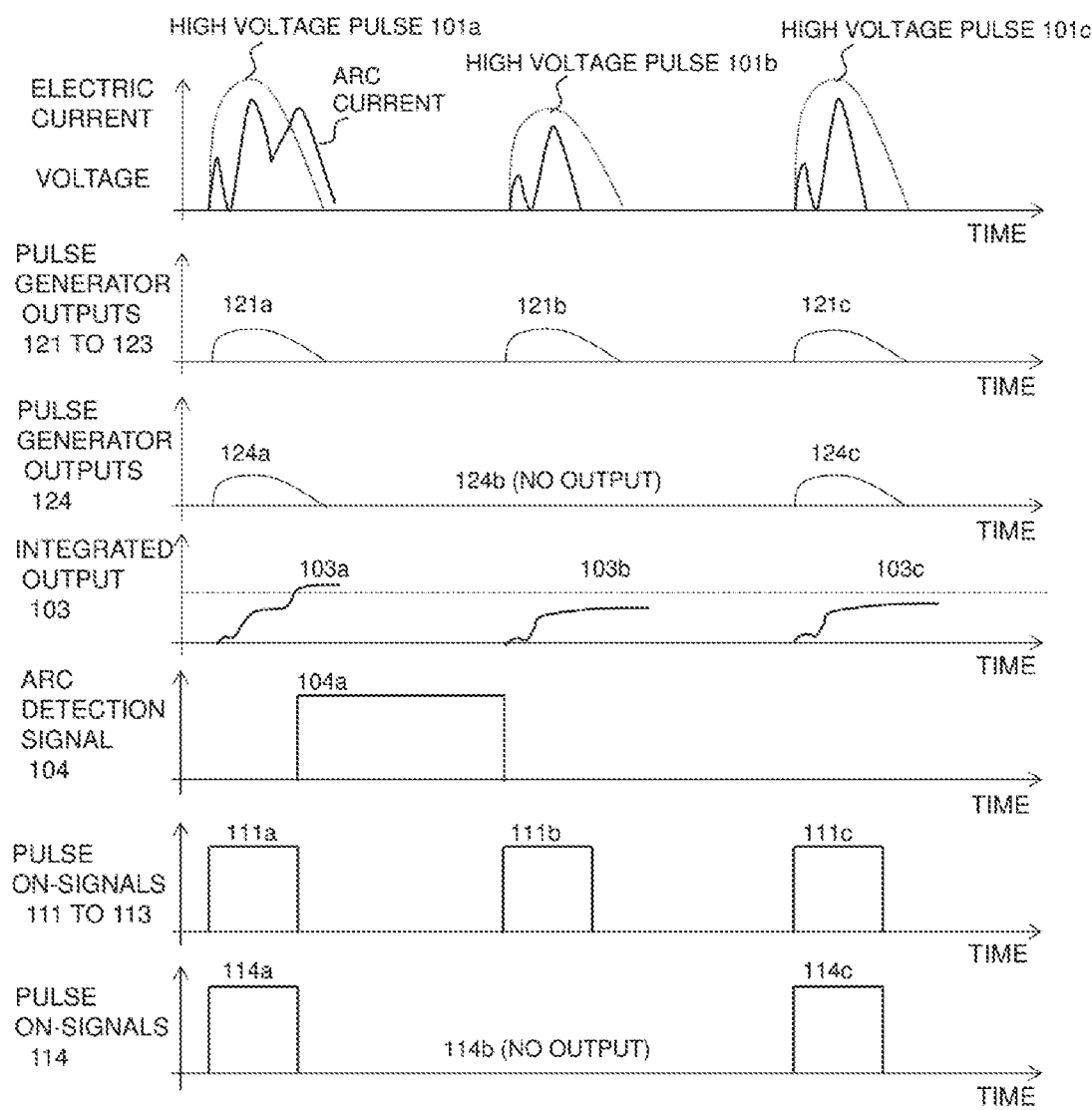
FIG. 6 is an illustrative diagram for explaining a local discharge suppressing process in a control circuit according to Embodiment 1.

FIG. 6 is an illustrative diagram for explaining a suppressing process of local discharge in the control circuit 3 according to Embodiment 1. In the view illustrated at the uppermost level of FIG. 6, the vertical axis indicates levels of an electric current and a voltage, and the horizontal axis indicates time. In addition, the solid-line curve indicates an electric current, and the dotted-line curve indicates a voltage (the same also applies to the view at each of the uppermost level in FIG. 9A, FIG. 9C, and FIG. 10 through FIG. 12 as will be explained below).

Each notation inside the parentheses of the vertical axis indicates a signal (s) being referred to; for example, in a case in which a plurality of signals is referred to as the "pulse ON-signals (111 to 113)," they indicate that the shapes of "112*a*" and "113*a*" not shown along the time axis in the figure are each the same as the shape of "111*a*" even when one shape of "111*a*" is shown in the figure (those shapes are omitted in the figure).

In the one example of FIG. 6, the first pulse ON-signals 111*a* through 114*a* are outputted from the control circuit 3 into the pulse generators 21 through 24, respectively, and a first high voltage pulse 101*a* is applied from the inductive adding device 20 to the water-treatment reactor 6*a*. Because an integration value of an electric current produced in accordance with the application of the high voltage pulse 101*a* exceeds the arc-transition determination criterion value 106, the comparator 52 outputs, based on the electric current's integration value, an arc detection signal 104*a* for restricting arc transition into the control circuit 3.

In addition, in FIG. 6, the control circuit 3 having received the arc detection signal 104*a* for restricting arc transition outputs the integration preparation instruction 105 into the discharge signal processing unit 5 so that an integration process is reset, and also performs the control to introduce a next high voltage pulse 101*b* whose voltage value is lowered than that of the first high voltage pulse 101*a*, so that arc transition in the next high voltage pulse 101*b* is restricted.

In the one example of FIG. 6, the pulse ON-signals 111*b* through 113*b* are produced, but the pulse ON-signal 114*b* is not produced. In other words, the output value of the pulse ON-signal 114*b* is set at zero. The inductive adding device 20 receives the pulse ON-signals 111*b* through 113*b*, and generates the next high voltage pulse 101*b* whose voltage value is lowered than that of the first high voltage pulse 101*a*; and the inductive adding device applies the high voltage pulse 101*b* being generated across the discharge load 6*a*. Because an integration value of an electric current produced in accordance with the application of the high voltage pulse 101*b* does not exceed the arc-transition determination criterion value 106, the comparator 52 does not output in the next time, based on the electric current's integration value, the arc detection signal 104 into the control circuit 3.

Moreover, in FIG. 6, the control circuit 3 which does not receive the arc detection signal 104 for a second time with respect to the discharge load 6*a* outputs the integration preparation instruction 105 into the discharge signal processing unit 5 so that an integration process is reset, and also introduces, based on an integration result, a further next high voltage pulse 101*c* to achieve a voltage value of the next high voltage pulse 101*b* or more.

In the one example of FIG. 6, the pulse ON-signal 114*c* is produced together with the pulse ON-signals 111*c* through 113*c* (those pulse shapes of 112*c* and 113*c* are each the same as the shape of 111*c*), and the high voltage pulse 101*c* is generated which becomes a voltage value of the high voltage pulse 101*b* or more; and the high voltage pulse 101*c* having been generated is applied across the discharge load 6*a*, so that an appropriate process is continued.

Furthermore, in the one example of FIG. 6, an application voltage has been lowered by curbing the pulse ON-signal 114*b* down to zero with respect to the arc detection signal 104*a*. However, an output value of the pulse ON-signal 114*b* may be reduced between "zero" and "one time," and the pulse ON-signal 112*b* may be further curbed; and the pulse ON-signal 113*b* may be yet further curbed. By adopting such an implementation mechanism of local discharge suppressing process, it becomes possible to avoid the reduction of electric discharge efficiency to the extent possible, based on the local discharge suppressing process.

Hereinbefore, a power supply of an inductive voltage adding method is described in which four stages are layered; however, there is no limit on the number of stages. It is also possible to use a power supply having a plurality of pulse generation units in stages in the degree of several tens of the stages.

In this embodiment, the inductive voltage adding method is illustrated as an exemplary arrangement of the pulse discharge power supply 1; however, it may be adopted that the pulse discharge power supply 1 takes on a circuit configuration using a Marx generator or circuit in which pulse generators are coupled in multiple stages with one another by means of electrical conduction. Because a magnetic core is not used in the Marx circuit for coupling with a load, it is possible to curb reduction of power supply efficiency due to losses in the core, and increase in costs in accordance with the core.

As described above, the discharge signal processing unit 5 receives the integration preparation instruction 105, and executes, using the integration circuit 51 which resets an integration process, an integration process with respect to the pulse ON-signals 111 through 114 outputted from the control circuit 3. For this reason, the discharge signal processing unit 5 is enabled to avoid an influence originating in an electric current before receiving the integration preparation instruction 105. Therefore, in the pulse discharge power supply 1 according to Embodiment 1, it becomes possible to achieve the determination which is comparatively strong against noises and high in accuracy with respect to arc transition.

Figure 7:
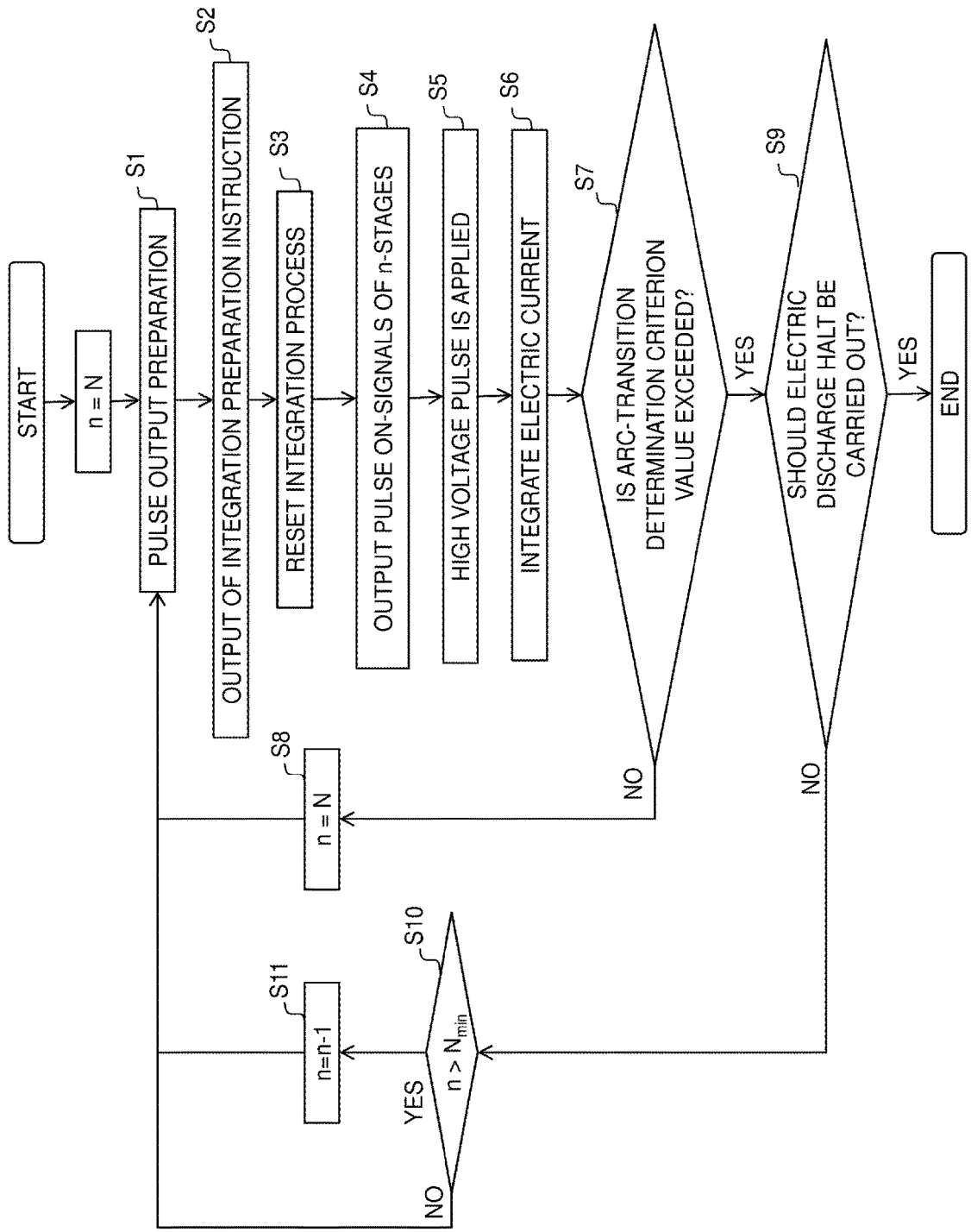
FIG. 7 is a flowchart illustrating a control method of the control circuit according to Embodiment 1.

FIG. 7 is a flowchart illustrating a control method of the control circuit 3 according to Embodiment 1. In the figure, symbol "N" designates the number of stages of total pulse generators (a sum-total of the number of stages of pulse generators constituting the pulse generation unit), and symbol "Nmin," the number of output stages of minimum pulse generators. Here, the symbol "Nmin" means the number of stages by which a voltage level of a high voltage pulse which should be outputted at a minimum is specified.

The control circuit 3 outputs, when a predetermined condition (s) is fulfilled (Step S1), the integration preparation instruction 105 into the integration circuit 51 (Step S2), and resets an integration process of the integration circuit 51 (Step S3). Subsequently, the pulse ON-signal 110 of a predetermined number of stages is outputted into the pulse generation unit 2 (Step S4), so that the high voltage pulse 101 based on the pulse ON-signal 110 is applied across the discharge load 6 (Step S5).

The control circuit 3 lets the integration circuit 51 integrate an electric current of the discharge load 6 being generated by means of the application of the high voltage pulse 101 after having reset the integration process (Step S6). The control circuit 3 lets the comparator 52 compare the arc-transition determination criterion value 106 being stored with an integration result of the integration circuit 51, and lets the comparator make determination whether or not the integration result exceeds the arc-transition determination criterion value 106 being stored (Step S7).

When the integration result of the integration circuit 51 exceeds the arc-transition determination criterion value 106 being stored (when "YES" at Step S7), the control circuit 3 makes determination, based on the integration result, whether or not an electric discharge halt should be carried out, for example, based on the frequency within a predetermined time-duration when an electric current's integration value reaches the arc-transition determination criterion value 106 or more, and also, for example, based on the difference between the arc-transition determination criterion value 106 and the integration result (Step S9).

When determination is made in which an electric discharge halt should be carried out (when "YES" at Step S9), the control circuit 3 ends the processes without outputting next pulse ON-signal 110 for introducing next high voltage pulse 101.

When determination is not made in which an electric discharge halt should be carried out (when "NO" at Step S9), the control circuit 3 sets a small number of stage(s) than the number of stages of the pulse generators 21 through 24 to which the pulse ON-signal 110 has been outputted at Step S4 (Step S11), in order to introduce the next high voltage pulse 101 which has smaller value than that of the high voltage pulse 101 having been applied at Step S5.

However, the control is performed so as not to fall below the number of output stages of minimum pulse generators, Nmin (Step S10). The control circuit 3 returns to Step S1, and repeats the processes after having undergone.

When an integration result of the integration circuit 51 does not exceed the arc-transition determination criterion value 106 being stored (when "NO" at Step S7), the control circuit 3 sets the number of stages "n" of the pulse ON-signal 110 being outputted at Step S4 at the number of stages of total pulse generators "N" in order to introduce the high voltage pulse 101 outputted by the number of total stages N (here, N=4) of the pulse generators 21 through 24 (Step S8). The control circuit 3 returns to the pulse output preparation (Step S1), and repeats the processes after having undergone.

As described above, the pulse discharge power supply 1 according to Embodiment 1 can increase and decrease a value of the second high voltage pulse 101 subsequently applied, based on an integration value of an electric current into the discharge load 6 in accordance with the application of the first high voltage pulse 101. For this reason, the pulse discharge power supply 1 according to Embodiment 1 can achieve, whilst the reduction of electric discharge efficiency is curbed, to suppress an occurrence of local discharge in an electric discharge treatment technology.

Embodiment 2

Figure 8:
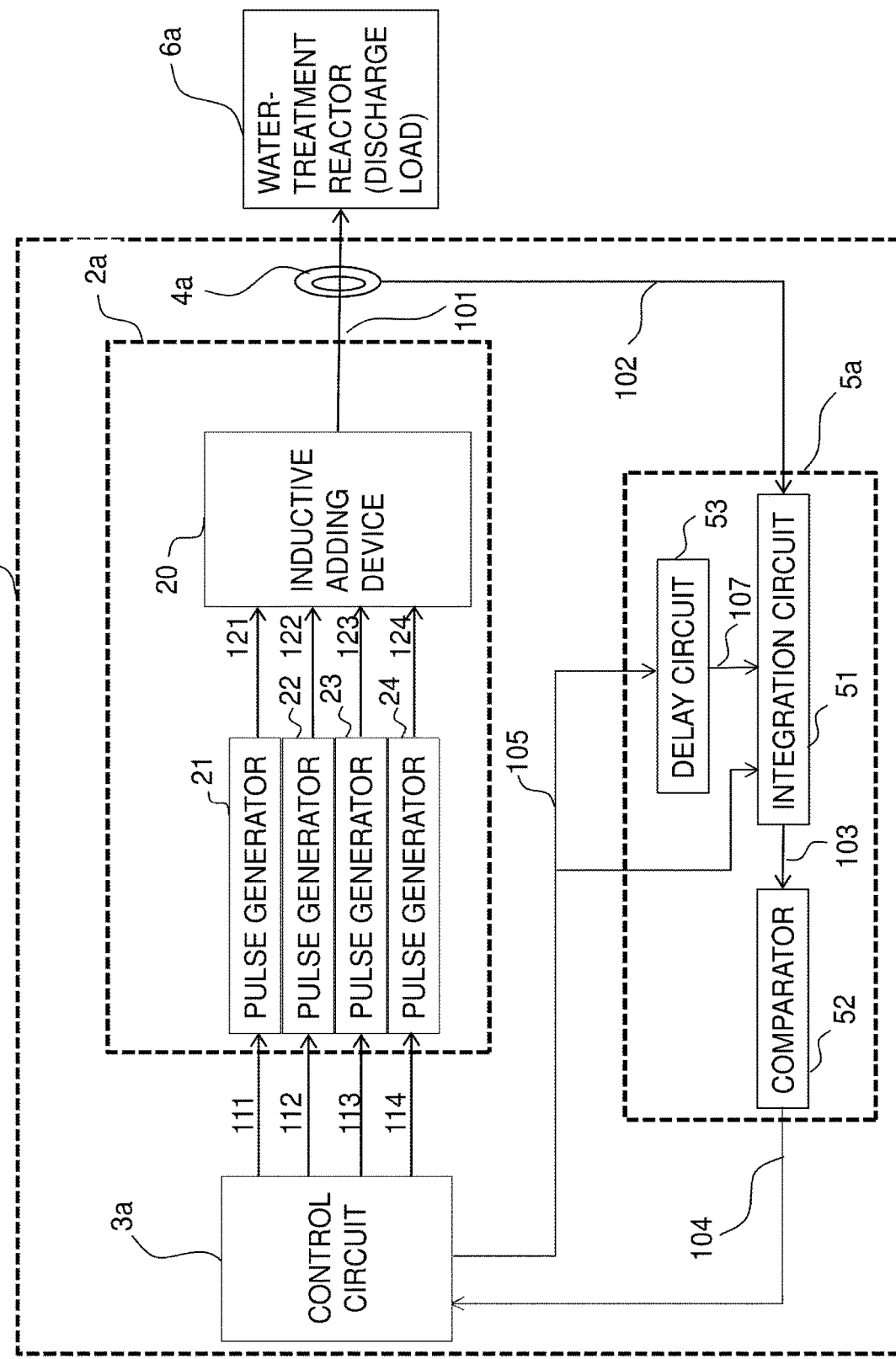
FIG. 8 is a block diagram illustrating an example of configuration of a pulse discharge power supply according to Embodiment 2.

FIG. 8 is a block diagram illustrating an example of configuration of the pulse discharge power supply 1 according to Embodiment 2. A pulse discharge power supply 1b of FIG. 8 is of an inductive voltage adding type which differs from the inductive voltage adding-type pulse discharge power supply illustrated in FIG. 5 according to Embodiment 1; the discharge signal processing unit 5 further includes a delay circuit 53, which outputs an integration commencement instruction 107. Hereinafter, the explanation will be made for the pulse discharge power supply 1b according to Embodiment 2 focusing on different points from the configuration of the inductive voltage adding-type pulse discharge power supply according to Embodiment 1.

In pulse discharge in which a large electric current flows in a short time, there arises a fear in which oscillating noise components are superposed on the electric current monitoring signal 102. When oscillating noise components are superposed thereon, it is preferable that the arc-transition determination criterion value 106 is modified in accordance with the amount of superposition of the oscillating noise components. However, oscillating noise components are easy to vary, so that it is difficult to appropriately modify the arc-transition determination criterion value 106 by predicting the amount of superposition of the oscillating noise components.

As described above, the first peak of FIG. 3 between about 150 nanoseconds and about 200 nanoseconds and the second peak thereof between about 150 nanoseconds and about 250 nanoseconds are not really strongly related to the occurrence of arc transition. When the integration is also performed with respect to an electric current between about 150 nanoseconds and about 200 nanoseconds including the first peak as described above and with respect to an electric current between about 200 nanoseconds and about 250 nanoseconds including the secondpeak, there arises a fear in which superposition of the oscillating noise components increases. For this reason, when the electric currents of FIG. 3 between about 150 nanoseconds and about 250 nanoseconds are corresponded to, there also arises a fear in which it becomes difficult to set the arc-transition determination criterion value 106.

Therefore, in the pulse discharge power supply 1*b* according to Embodiment 2, the integration is started by delaying more by a predetermined time-duration than the pulse discharge power supply 1*a* according to Embodiment 1. As an example, by avoiding the first peak and the second peak that are not strong in the relationship to arc transition, commencement timing of the integration is delayed in time until after about 250 nanoseconds of FIG. 3.

Figure 9A:
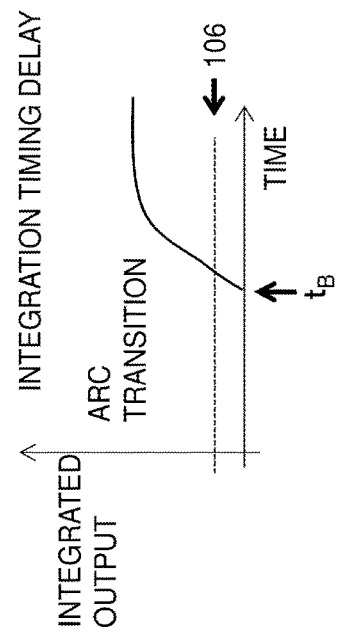
FIGS. 9A, 9B, 9C and 9D are illustrative diagrams each for explaining integration timing of an integration circuit according to Embodiment 2.
Figure 9B:
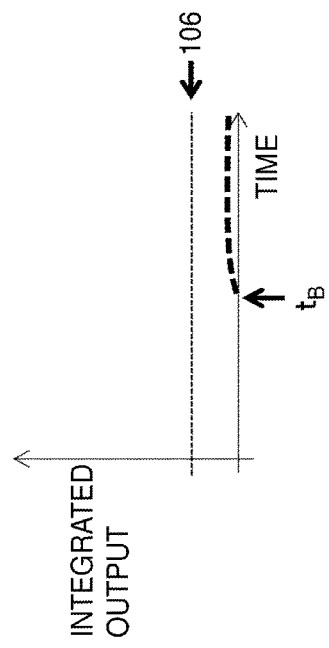

FIGS. 9A, 9B, 9C and 9D are illustrative diagrams each for explaining integration timing of the integration circuit 51 according to Embodiment 2. The graph illustrated in FIG. 9A shows an example of the relationship of an electric current and a voltage in contrast to time, when arc transition occurs in association with the high voltage pulse 101. The graph illustrated in FIG. 9B shows an example of the relationship between an integration value of an electric current with respect to the high voltage pulse 101 and time.

In the examples shown in FIGS. 9A and 9B, the integration circuit 51 receives the integration commencement instruction 107 outputted from the delay circuit 53 with timing of $t_B$, and then the integration starts. By starting the integration while avoiding the first peak and the second peak that appear at early timings of the application of the high voltage pulse 101, it becomes possible to avoid an influence of noise components with respect to the integrated output 103 to the extent possible. For this reason, with respect to carrying out the local discharge suppressing process, it becomes possible to achieve the pulse discharge power supply 1 that is strong against noises.

Figure 9C:
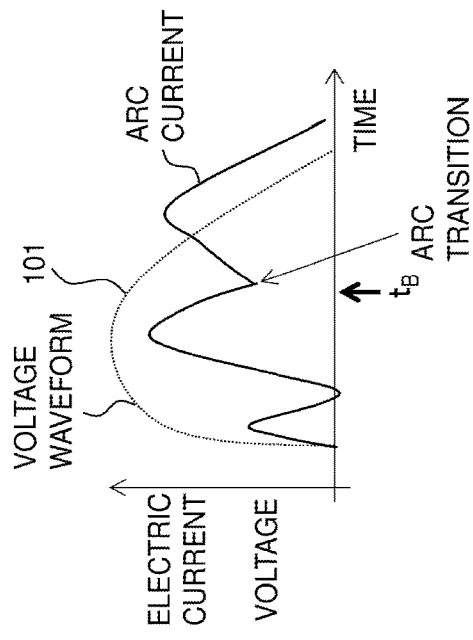
Figure 9D:
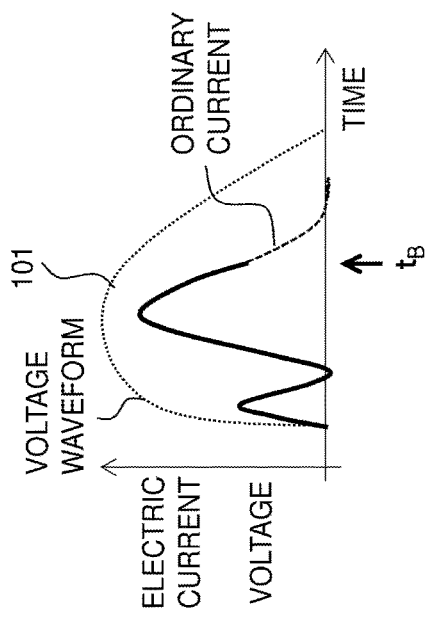

Note that, in order to compare with the case that the arc transition occurs, similar graphs are shown in a case of an ordinary current in FIG. 9C and FIG. 9D in the formation corresponding to FIG. 9A and FIG. 9B described above.

As shown in FIG. 3 and FIG. 4A, arc transition occurs in the latter half of the application of the high voltage pulse 101, so that an arc current is generated. Using the occurrence characteristic, the integration is started after delaying by a predetermined time-duration from the time-point of the application of the high voltage pulse 101. To be specific, after having delayed by a predetermined time-duration, the integration commencement instruction 107 for starting the integration is outputted toward the integration circuit 51.

The control circuit 3 inputs the integration preparation instruction 105 into the delay circuit 53 and the integration circuit 51 in advance of the control circuit's pulse ON-signals 111 through 114. The delay circuit 53 having received the integration preparation instruction 105 holds the integration preparation instruction 105 for a predetermined delay time, and sets the integration commencement instruction 107; and the integration commencement instruction 107 is outputted toward the integration circuit 51 after having held for the predetermined delay time.

The integration circuit 51 having been received the integration preparation instruction 105 resets an integration process being performed until this time, and further receives the integration commencement instruction 107 so as to newly start an integration process. Namely, the integration circuit 51 starts a new integration process with timing of $t_B$ in FIGS. 9A to 9D, and calculates an integration value based on an electric current value detected after the timing of $t_B$ in FIGS. 9A to 9D onward; and the integration circuit outputs a signal based on a calculation result into the comparator 52 as the integrated output 103.

As described above, by using the delay circuit 53, the pulse discharge power supply 1*b* according to Embodiment 2 can be given to make the determination whether or not the local discharge suppressing process is carried out, whilst an influence of noise components to be caused before arc transition is avoided to the extent possible. For this reason, with respect to carrying out the local discharge suppressing process, it becomes possible to achieve the pulse discharge power supply 1 that is strong against noises.

The pulse discharge power supply 1*b* according to Embodiment 2 holds an arc suppression output pattern based on the arc detection signal 104 having been outputted by way of the integration commencement instruction 107. Based on the arc detection signal 104 being received and on the arc suppression output pattern being held, the control circuit 3 selects from a plurality of signals being preset the appropriate pulse ON-signals 111 through 114, and outputs them into the pulse generators 21 through 24, respectively.

Figure 10:
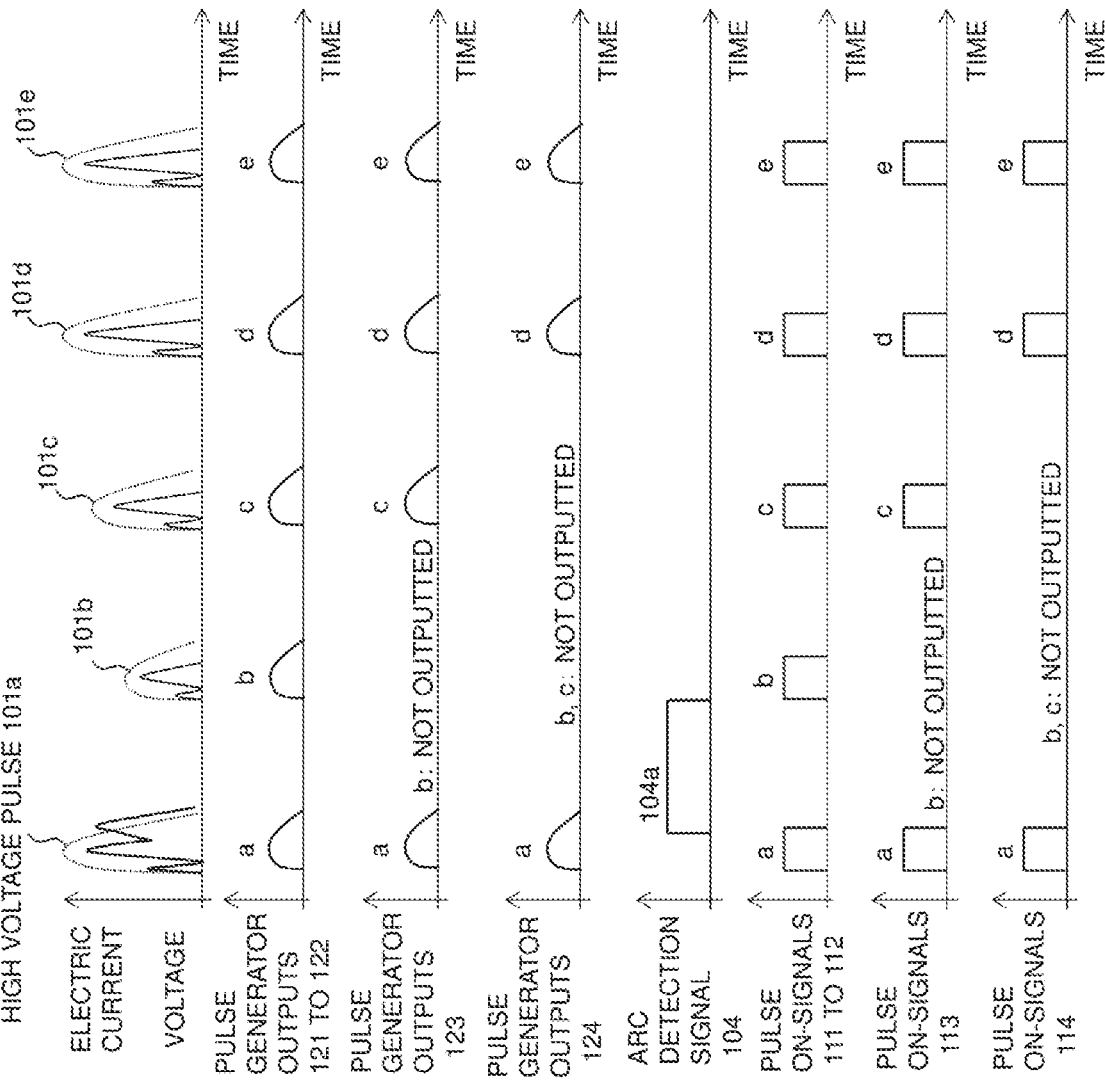
FIG. 10 is an illustrative diagram for explaining an example of arc suppression output patterns of the pulse discharge power supply according to Embodiment 2.

FIG. 10 is an illustrative diagram for explaining an example of arc suppression output patterns of the pulse discharge power supply 1*b* according to Embodiment 2. In the one example illustrated in FIG. 10, the output patterns are shown in which, following a first high voltage pulse 101*a*, a second high voltage pulse 101*b*, a third high voltage pulse 101*c*, a fourth high voltage pulse 101*d* and a fifth high voltage pulse 101*e* are outputted.

The control circuit 3 receives the arc detection signal 104*a* for restricting arc transition with respect to the first high voltage pulse 101*a*, and produces the pulse ON-signals 111*b* and 112*b*; however, by not producing the pulse ON-signals 113*b* and 114*b*, the control circuit performs the control to output the second high voltage pulse 101*b* whose voltage value is reduced than that of the first high voltage pulse 101*a*. At the time of introducing the second high voltage pulse 101*b*, local discharge can be avoided by reducing the voltages of the pulse generators 23 and 24 by the amounts of two stages so that electric power entering into electric discharge based on the second high voltage pulse 101*b* is decreased so as to restrict arc transition.

In FIG. 10, the control circuit 3 does not receive arc detection signal 104 for restricting arc transition with respect to the second high voltage pulse 101*b*; however, the control circuit produces the pulse ON-signals 111*c*, 112*c* and 113*c*, whereas the control circuit does not produce the pulse ON-signal 114*c* in response to the arc detection signal 104*a*. According to this arrangement, the control circuit performs a control for outputting the third high voltage pulse 101*c* that has a voltage value in the same degree of the second high voltage pulse 101*b* or more, but has a voltage value of the ordinary high voltage pulse 101*a* or less. At the time of introducing the third high voltage pulse 101*c*, local discharge can be avoided by reducing the voltage of the pulse generator 24 by the amount of one stage so that electric power entering into the electric discharge is decreased so as to restrict arc transition, whilst application efficiency is increased to the extent possible.

In FIG. 10, the control circuit 3 does not receive the arc detection signal 104 regarding to the discharge load 6 with respect to the third high voltage pulse 101*c*; and, by producing the pulse ON-signals 111d through 114d, the control circuit performs a control for outputting the fourth high voltage pulse 101d that has a voltage value larger than that of the third high voltage pulse 101c, and has the voltage value equivalent to the ordinary high voltage pulse 101a. At the time of introducing the fourth high voltage pulse 101d, application efficiency can be increased to the extent possible by not reducing the voltage in any one of the pulse generators 21 through 24, whilst local discharge is avoided.

The comparator 52 according to Embodiment 2 is provided with the arc-transition determination criterion value 106; and the comparator compares the arc-transition determination criterion value 106 with an integration value, and, based on the magnitude of the difference between the values, the number of stages of the pulse ON-signals is altered. However, it may be adopted that, by providing with a plurality of arc-transition determination criterion values 106 whose values are different from one another, the plurality of the arc-transition determination criterion values 106 is compared with integration values, and that the number of stages of the pulse ON-signals is altered. In addition, it may be adopted that the number of stages of the pulse generators 21 through 24 for curbing pulse generations is not only altered, and that a value (s) of the single stage pulses 121 through 124 that the pulse generators 21 through 24 each generate is altered. According to the manner of altering as described above, it becomes possible to flexibly alter the degree of curbing the high voltage pulse 101 to be applied across the discharge load 6.

The control circuit 3 can store the number of events in which the arc detection signal 104 for restricting arc transition has been received for a predetermined time-duration. When the number of events in which the arc detection signal 104 has been received reaches a predetermined value or more, the control circuit 3 performs an operation halt of the device itself of the pulse discharge power supply 1 for carrying out an electric discharge halt. By taking the configuration described above, it is possible to avoid arc transition at all times due to a fault of the device, and a short-circuit event due to a reason other than electric discharge.

Embodiment 3

Figure 11:
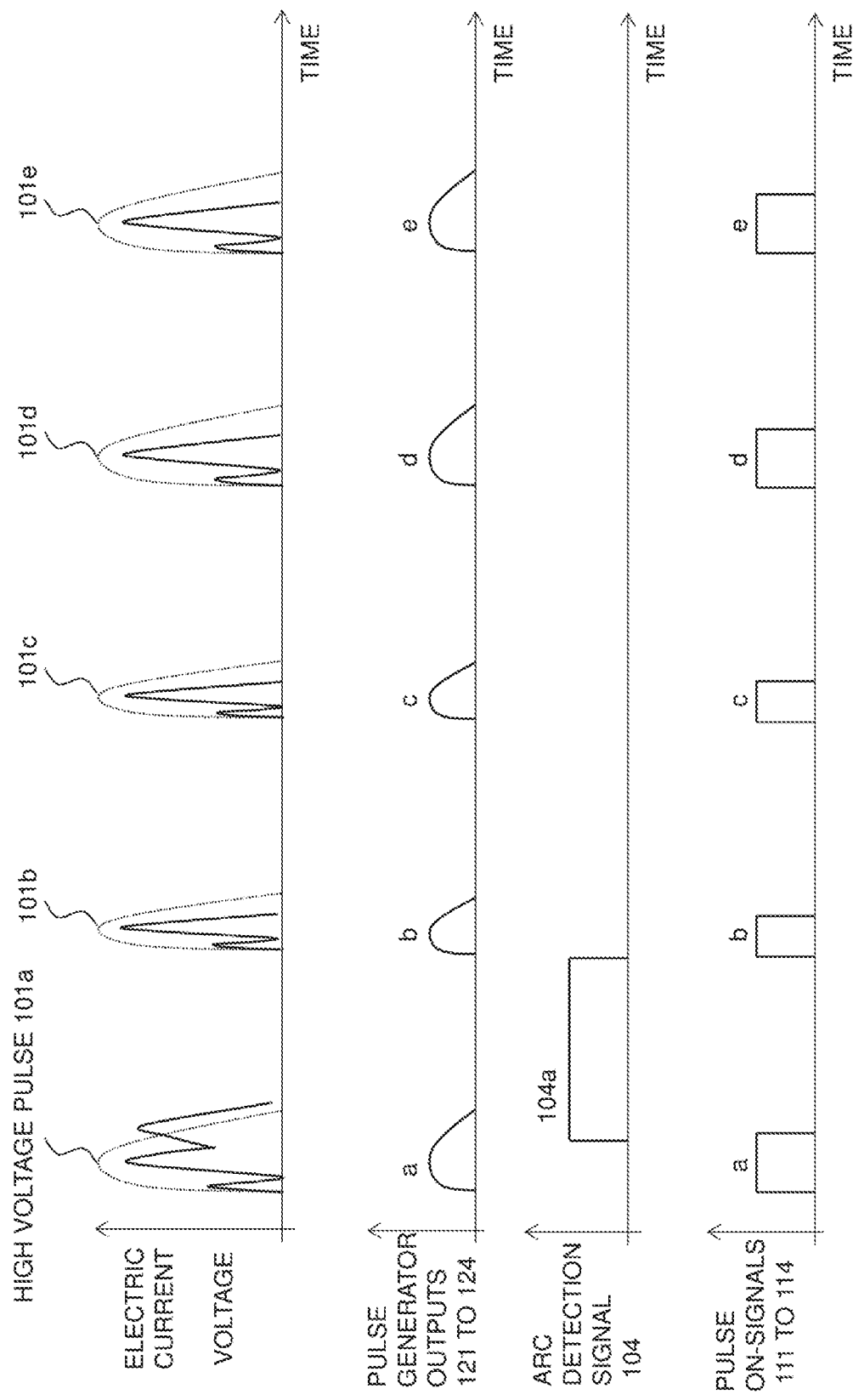
FIG. 11 is an illustrative diagram for explaining an example of arc suppression output patterns of a pulse discharge power supply according to Embodiment 3.

FIG. 11 is an illustrative diagram for explaining an example of arc suppression output patterns of a pulse discharge power supply according to Embodiment 3. In the arc suppression output patterns of FIG. 11, duration times of the pulse ON-signals 111 through 114 are altered differing from the arc suppression output patterns of the pulse discharge power supply 1b of FIG. 10 according to Embodiment 2 in which the output values of the pulse ON-signals 111 through 114 being produced are altered. Hereinafter, the explanation will be made for the pulse discharge power supply 1 according to Embodiment 3 focusing on different points from the configuration of the pulse discharge power supply 1b according to Embodiment 2.

When the control circuit 3 receives the arc detection signal 104a for restricting arc transition with respect to the high voltage pulse 101a based on the pulse ON-signals 111a through 114a, the control circuit outputs, in response to the arc detection signal 104a, next pulse ON-signals 111b through 114b whose at least one duration time is shortened more than a duration time of the pulse ON-signals 111a through 114a.

The inductive adding device 20 having received the pulse ON-signals 111b through 114b whose at least one duration time is shortened generates the high voltage pulse 101b whose time-duration width is made narrower than that of the high voltage pulse 101a, and applies the high voltage pulse 101b across the discharge load 6.

With respect to the application of the high voltage pulse 101b whose time-duration width is made narrower, an electric current value produced in the discharge load 6 is similar to a case in which the high voltage pulse 101b is applied; however, the voltage application ends before arc transition occurs. Therefore, arc transition and local discharge can be restricted.

In the one example of FIG. 11, the control circuit 3 does not receive the arc detection signal 104 for restricting arc transition with respect to the high voltage pulse 101b; however, by means of the control giving consideration to the arc detection signal 104a by one upstream signal, the control circuit shortens and outputs at least one duration time of the next pulse ON-signals 111c through 114c similarly to duration times of the pulse ON-signals 111b through 114b.

With respect to the high voltage pulse 101c having been outputted based on the pulse ON-signals 111c through 114c, the control circuit 3 does not receive the arc detection signal 104, and outputs next pulse ON-signals 111d through 114d whose duration time is returned in the same degree of the duration time of the original pulse ON-signals 111a through 114a.

With respect to the high voltage pulse 101d having been outputted based on the pulse ON-signals 111d through 114d, the control circuit 3 does not receive the arc detection signal 104, and outputs next pulse ON-signals 111e through 114e whose duration time is set in the same degree of the duration time of the original pulse ON-signals 111a through 114a.

In FIG. 11, all of the duration times of the pulse ON-signals 111 through 114 is similarly increased and decreased so that arc transition should be restricted. However, duration times of the pulse ON-signals 111 through 114 each may be independently increased and decreased. For example, only the duration time of the pulse ON-signal 111 may also be increased and decreased. By adopting such a configuration, it becomes possible to flexibly increase and decrease a time-duration width of the high voltage pulse 101, and to flexibly alter the degree of suppressing local discharge in the discharge load 6.

Embodiment 4

Figure 12:
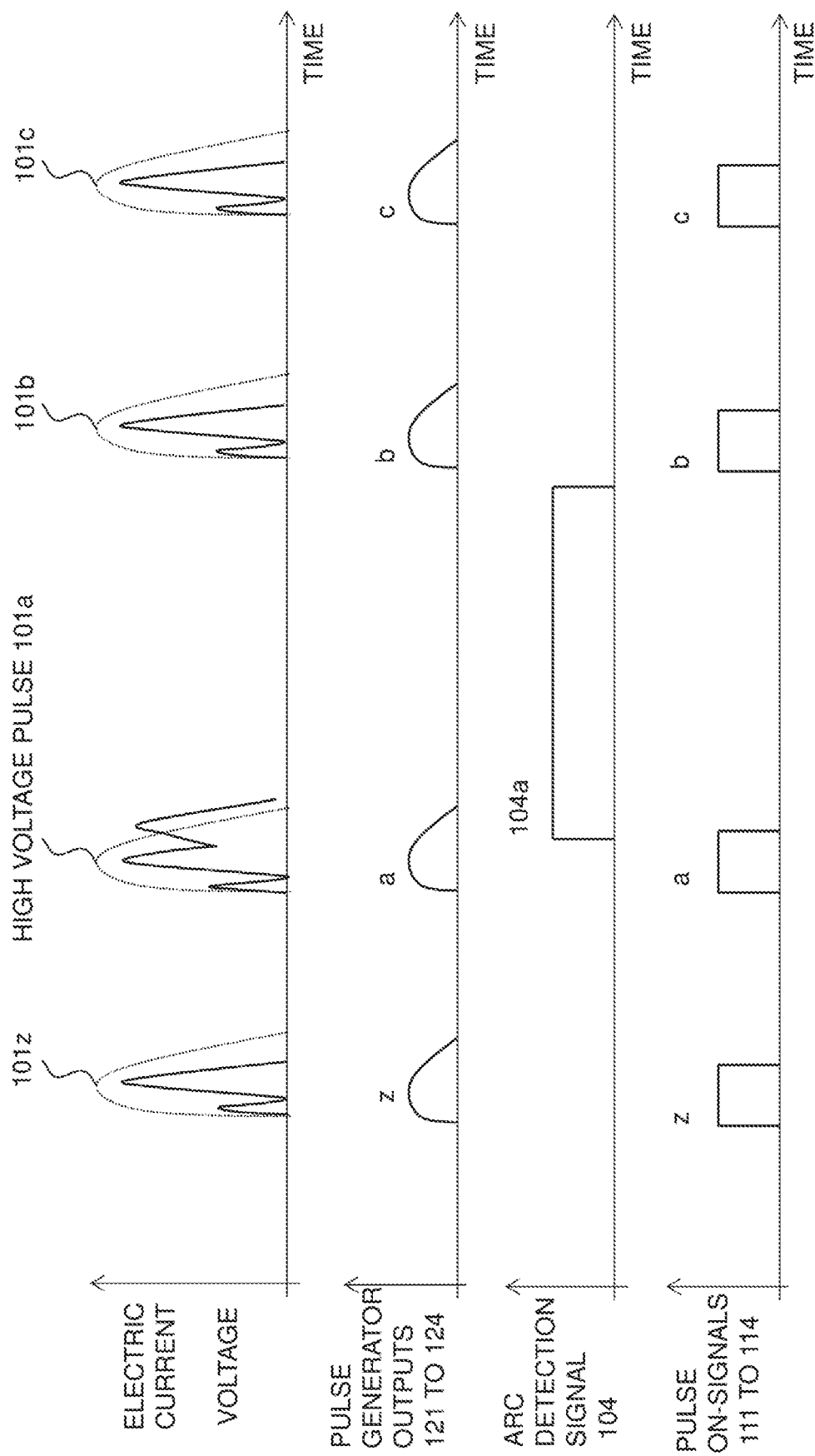
FIG. 12 is an illustrative diagram for explaining an example of arc suppression output patterns of a pulse discharge power supply according to Embodiment 4.

FIG. 12 is an illustrative diagram for explaining an example of arc suppression output patterns of a pulse discharge power supply according to Embodiment 4. In the arc suppression output patterns of FIG. 12, pulse-to-pulse periods of the pulse ON-signals 111 through 114 are altered differing from the arc suppression output patterns of the pulse discharge power supply b of FIG. 10 according to Embodiment 2 in which the output values of the pulse ON-signals 111 through 114 being produced are altered. The explanation will be made for the pulse discharge power supply 1 according to Embodiment 4 focusing on different points from the configuration of the pulse discharge power supply 1b according to Embodiment 2.

When a control circuit 3a receives the arc detection signal 104a for restricting arc transition with respect to the high voltage pulse 101a based on the pulse ON-signals 111a through 114a, the control circuit outputs the pulse ON-signals 111b through 114b so that, in response to the arc detection signal 104a, a pulse-to-pulse period of next pulse ON-signals 111b through 114b is extended more than a pulse-to-pulse period between the pulse ON-signals 111a through 114a and the pulse ON-signals 111z through 114z which are preceding the pulse ON-signals 111a through 114a.

The inductive adding device 20 that has received the pulse ON-signals 111b through 114b in which their pulse-to-pulse period is extended then generates the high voltage pulse 101b where a pulse repetition frequency (a reciprocal number of an pulse-to-pulse interval) has been lowered temporarily from the frequency until the high voltage pulse 101a, and applies the high voltage pulse 101b to the discharge load 6a.

With respect to the application of the high voltage pulse 101b in which the pulse-to-pulse interval is extended, it becomes difficult to occur arc transition in an electric current value generated by the discharge load 6a than that when the high voltage pulse 101a is applied thereto. Because, as to arc transition, increases of density of ions and radicals formed by electric discharge, and a discharge gas temperature are influenced, and the temperature and the density attenuate by means of the extension of the pulse-to-pulse interval, a probability in which arc transition occurs is lowered. Therefore, arc transition and local discharge can be restricted.

Moreover, when the arc detection signal 104 is not received, usual discharge treatment is returned with respect to the following high voltage pulse 101c by recovering a pulse-to-pulse interval of the pulse ON-signals 111 through 114 to that of those before the high voltage pulse 101a.

In FIG. 12, an exemplary illustration is given in which the pulse-to-pulse periods are in two steps, and only a following one pulse is subjected to a pulse to become a target to be extended when the arc detection signal 104a is received. However, it may be adopted to perform a control in which, when the arc detection signal 104a is received in continual pulses, pulse-to-pulse periods are controlled in three steps or more, and the periods are further extended; and it may be adopted to perform a control in which a pulse (s) to become a target to be extended is astride a plurality of following two or more pulses.

Embodiment 5

Figure 13:
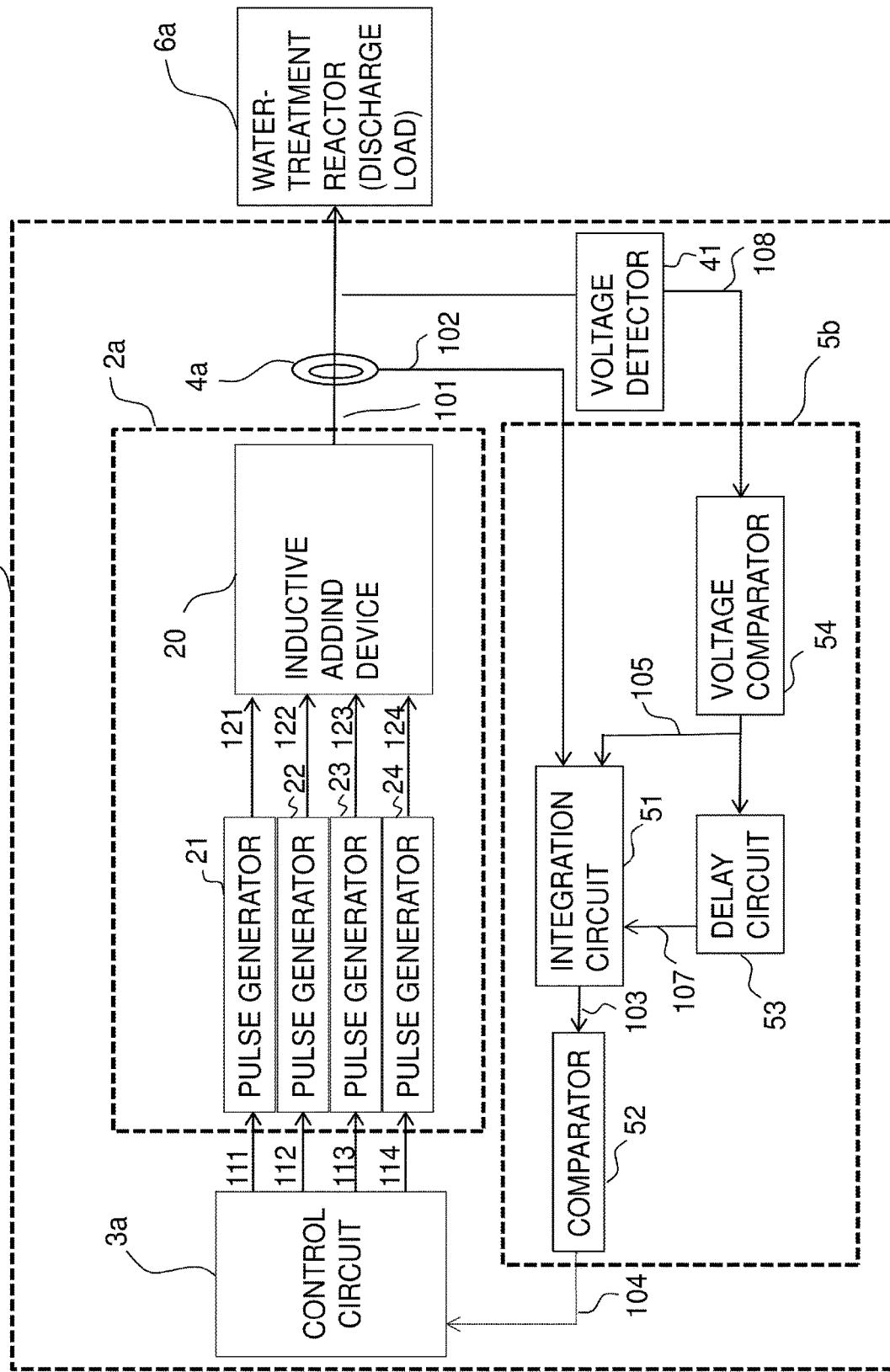
FIG. 13 is a block diagram illustrating an example of configuration of a pulse discharge power supply according to Embodiment 5.

FIG. 13 is a block diagram illustrating an example of configuration of the pulse discharge power supply 1 according to Embodiment 5. To a pulse discharge power supply Ic according to Embodiment 5, differing from the pulse discharge power supply 1a illustrated in FIG. 5 according to Embodiment 1, a voltage detector 41, the delay circuit 53 and a voltage comparator 54 are further added. The explanation will be made for the pulse discharge power supply Ic according to Embodiment 5 focusing on different points from the configuration of the pulse discharge power supply 1a according to Embodiment 1.

The voltage detector 41 is connected between the pulse generation unit 2a and the water-treatment reactor (discharge load) 6a, and the voltage detector performs the detection of a voltage. Moreover, the voltage detector 41 is also connected to the discharge signal processing unit 5. To be specific, the detection is performed on a voltage applied between the pulse generation unit 2a and the water-treatment reactor (discharge load) 6a, and, based on a detection result, a voltage monitoring signal 108 indicating a value of the voltage is outputted into the discharge signal processing unit 5. The voltage detector 41 is, for example, a voltage detection circuit or the like applying the principle of voltage divider combining in series a high-resistance resistor mounted between a high-voltage probe and a ground, and a resistor being a measurement object.

The discharge signal processing unit 5 includes, in addition to the integration circuit 51 and the comparator 52, the delay circuit 53 and the voltage comparator 54. The voltage comparator 54 stores a determination criterion voltage value, and compares a voltage value based on a received voltage monitoring signal 108 with the determination criterion voltage value. When a voltage value based on a received voltage monitoring signal 108 exceeds a determination criterion voltage value, the voltage comparator 54 outputs the integration preparation instruction 105 into the integration circuit 51. After the voltage value based on the received voltage monitoring signal 108 has exceeded the determination criterion voltage value, and in a case in which a voltage value based thereon reaches the determination criterion voltage value or less, the voltage comparator 54 outputs the integration preparation instruction 105 into the delay circuit 53.

The integration circuit 51 which receives the integration preparation instruction 105 from the voltage comparator 54 resets an integration process taking on up to this time. The delay circuit 53 which receives the integration preparation instruction 105 from the voltage comparator 54 produces the integration commencement instruction 107, and outputs the integration commencement instruction 107 into the integration circuit 51 after the passage of a predetermined delay time. After having received the integration preparation instruction 105 from the voltage comparator 54, the integration circuit 51 which receives the integration commencement instruction 107 from the delay circuit 53 starts an integration process based on the electric current monitoring signal 102 subsequently received, and outputs an integration result into the comparator 52 as the integrated output 103.

Figure 14:
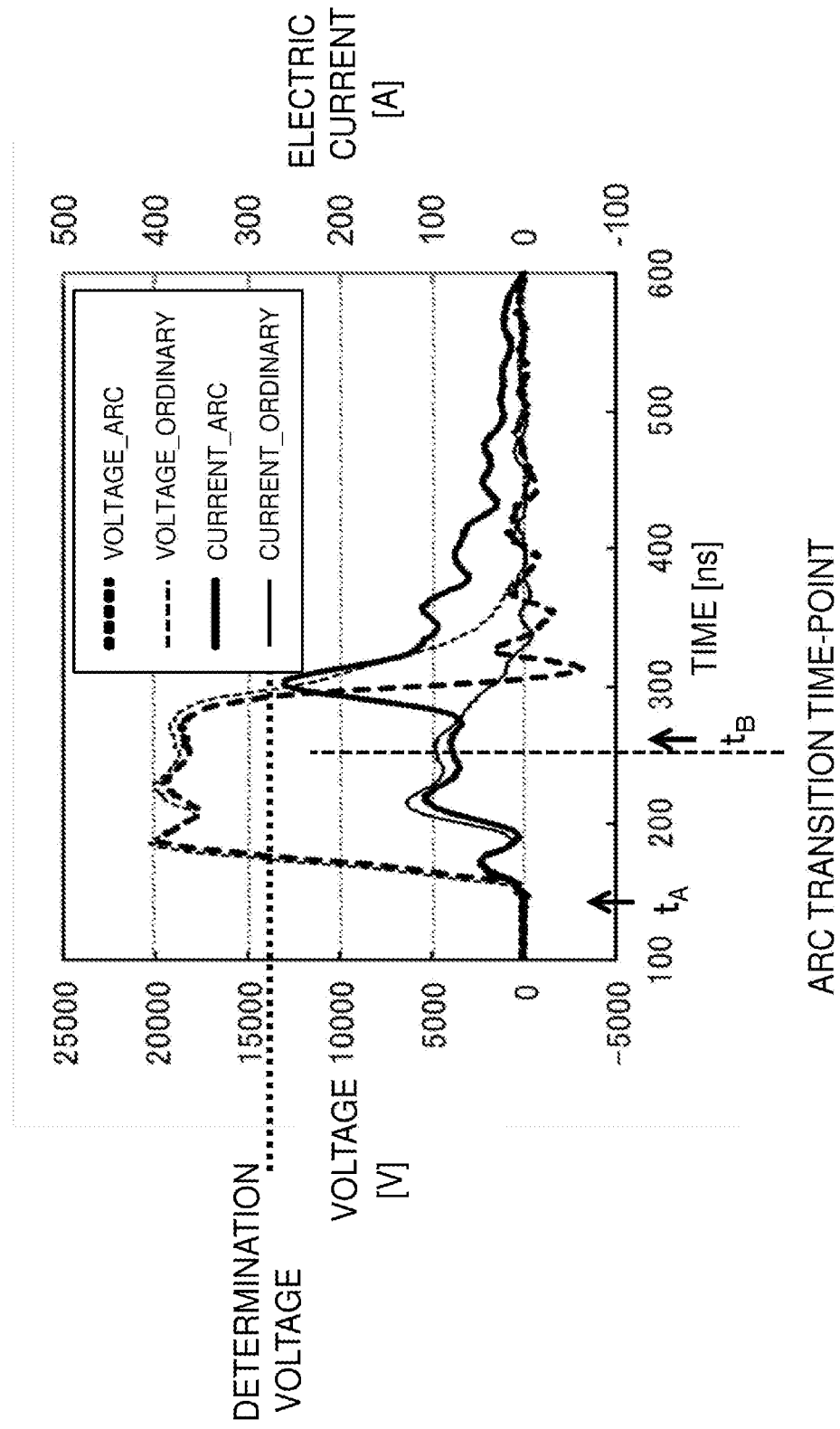
FIG. 14 is a diagram of electric current and voltage waveforms showing an example of the relationship between an electric current value and a voltage value with respect to a water-treatment reactor according to Embodiment 5.

FIG. 14 is a diagram of electric current and voltage waveforms showing an example of the relationship between an electric current value and a voltage value with respect to the water-treatment reactor 6a according to Embodiment 5. When the high voltage pulse 101 is applied to the water-treatment reactor the voltage detector 41 outputs the voltage monitoring signal 108 into the voltage comparator 54 of the discharge signal processing unit 5.

In the one example of FIG. 14, a voltage value based on the voltage monitoring signal 108 exceeds a determination criterion voltage value with timing of $t_A$, and, subsequently, reaches the determination criterion voltage value or less with timing of $t_B$. For this reason, the voltage comparator 54 outputs the integration preparation instruction 105 into the integration circuit 51 with the timing of $t_A$ so that an integration process of the integration circuit 51 is reset, and outputs the integration preparation instruction 105 into the delay circuit 53 with the timing of $t_B$ so that an integration process of the integration circuit 51 is newly started.

The integration circuit 51 having newly started the integration process after having done its reset then outputs the integrated output 103 based on the integration process into the comparator 52. The comparator 52 compares the integrated output 103 with the arc-transition determination criterion value 106, and outputs the arc detection signal 104 based on a comparison result into the control circuit 3. According to the configuration described above, it is enabled to perform the integration process excluding changes in electric current in which the relationship to arc transition is small. For this reason, it is possible to enhance the accuracy of determining a possibility of the occurrence of arc transition.

Embodiment 6

Figure 15:
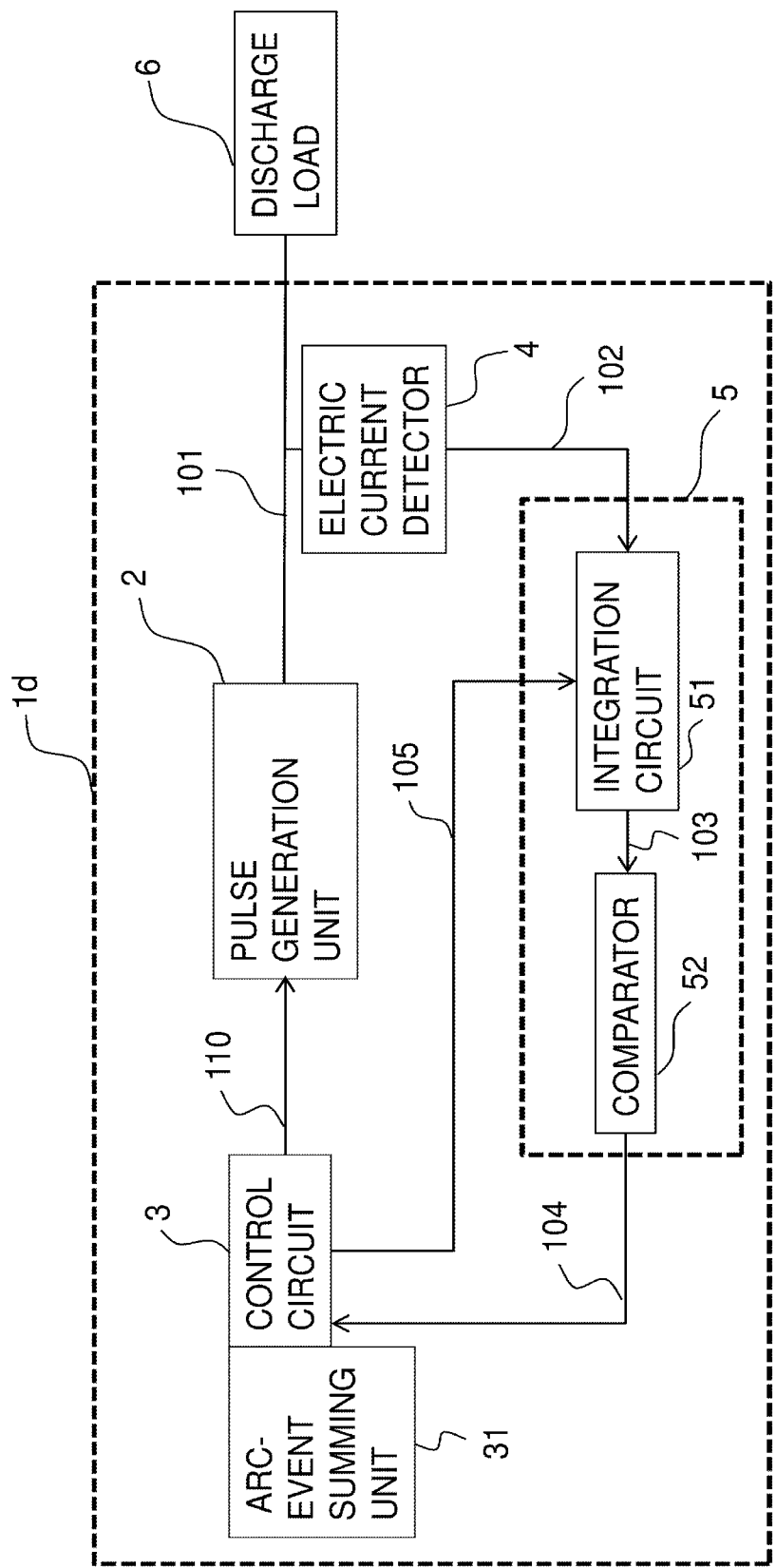
FIG. 15 is a block diagram illustrating an example of configuration of a pulse discharge power supply according to Embodiment 6.

FIG. 15 is a block diagram illustrating an example of configuration of the pulse discharge power supply 1 according to Embodiment 6. To a pulse discharge power supply 1d according to Embodiment 6, differing from the pulse discharge power supply 1a illustrated in FIG. 5 according to Embodiment 1, an arc-event summing unit 31 is further added. The explanation will be made for the pulse discharge power supply 1d according to Embodiment 6 focusing on different points from the configuration of the pulse discharge power supply 1a according to Embodiment 1.

The control circuit 3 according to Embodiment 6 includes the arc-event summing unit 31. The arc-event summing unit 31 is a constituent element for counting, with respect to the high voltage pulse 101a, the number of events in which the arc detection signal 104 for restricting arc transition has been inputted into the control circuit 3 as the number of an arc event (s), and is, for example, a counter.

The arc-event summing unit 31 adds the number of arc events when the arc detection signal 104 is inputted into the control circuit 3, and holds the number of arc events having been added until a predetermined reset operation is received. The number of arc events added by the arc-event summing unit 31 is displayed on a display portion such as a liquid-crystal panel not shown in the figures. In the aforementioned pulse discharge power supply 1d, when a predetermined number of arc events is exceeded, a warning based on the number of arc events is displayed on a display unit.

Arc transition is an event which largely influence on the amount of damage and wear-out of electrodes which determines a device's operating life. For this reason, by including the display unit, it is possible to notify timing for electrode replacement. Note that, in the present invention, each of the embodiments can be freely combined, and/or each of the embodiments can be appropriately modified or eliminated without departing from the scope of the invention.

EXPLANATION OF NUMERALS

Symbols "1, " "1a," "1b," "1c," "1d," each designate a pulse discharge power supply; "2," "2a," pulse generation unit; "3," "3a," control circuit; "4," electric current detector; "4a," current transformer; "5," discharge signal processing unit; "20," inductive adding device; "21," to "24," pulse generator; "31," arc-event summing unit; "41," voltage detector; "51," integration circuit; "52," comparator; "53," delay circuit; "54," voltage comparator; "6," discharge load; "6a," water-treatment reactor (discharge load); "101," high voltage pulse; "102," electric current monitoring signal; "103," integrated output; "104," arc detection signal; "105," integration preparation instruction; "106," arc-transition determination criterion value; "107," integration commencement instruction; "108," voltage monitoring signal; "110," to "114," pulse ON-signal; and "121," to "124," single stage pulse (pulse generator's output).

What is claimed is:

1. A pulse discharge power supply for introducing pulse discharge by outputting a voltage pulse for a plurality of times to a discharge load being a target of the pulse discharge, the pulse discharge power supply, comprising:
a pulse generator circuit including a capacitor discharge circuit configured to output a first voltage pulse, and output a second voltage pulse after outputting the first voltage pulse, the first voltage pulse being generated by superposition of a first plurality of pulses, the second voltage pulse being generated by superposition of a second plurality of pulses; and
a control circuit configured to control an output of the second voltage pulse based on an integration value of an electric current flowing into the discharge load with respect to the first voltage pulse.

2. The pulse discharge power supply as set forth in claim 1, wherein
the pulse generator circuit comprises:
a first pulse generator circuit configured to generate a first single stage pulse with respect to the first voltage pulse and a second single stage pulse with respect to the second voltage pulse as the first plurality of pulses;
a second pulse generator circuit configured to generate a third single stage pulse with respect to the first voltage pulse, and a fourth single stage pulse with respect to the second voltage pulse as the second plurality of pulses; and
an inductive pulse adder circuit configured to generate the first voltage pulse by performing superposition of the first single stage pulse and the third single stage pulse on each other, and to generate the second voltage pulse by performing superposition of the second single stage pulse and the fourth single stage pulse on each other.

3. The pulse discharge power supply as set forth in claim 2, further comprising:
an integrator circuit configured to calculate said integration value, wherein
the control circuit is configured to perform a control, based on the integration value calculated by the integrator circuit, so that a duration time of the second single stage pulse with respect to the second voltage pulse is reduced more than a duration time of the first pulse.

4. The pulse discharge power supply as set forth in claim 3, wherein the control circuit is configured to perform a control, based on the integration value calculated by the integrator circuit, so that a duration time of the fourth single stage pulse with respect to the second voltage pulse is reduced more than that of the third single stage pulse with respect to the first voltage pulse.

5. The pulse discharge power supply as set forth in claim 2, further comprising:
an integrator circuit configured to calculate said integration value, wherein
the control circuit is configured to perform a control, based on an integration value being calculated by the integrator circuit, so that a voltage value of the second single stage pulse with respect to the second voltage pulse is reduced more than a voltage value of the first pulse.

6. The pulse discharge power supply as set forth in claim 5, further comprising:
the integrator circuit configured to calculate said integration value, wherein
the control circuit is configured to perform a control, based on the integration value calculated by the integrator circuit, so that a pulse-to-pulse period between the first and third single stage pulses and the second and fourth single stage pulses is extended more than a pulse-to-pulse period of preceding first and third single stage pulses.

7. The pulse discharge power supply as set forth in claim 5, wherein the control circuit is configured to perform a control, based on the integration value calculated by the integrator circuit, so that a voltage value of the fourth single stage pulse with respect to the second voltage pulse is reduced more than that of the third single stage pulse with respect to the first voltage pulse.

8. The pulse discharge power supply as set forth in claim 5, wherein the control circuit is configured to output an integration preparation instruction for promoting to reset an integration value; and the integrator circuit is configured to receive the integration preparation instruction and starts, after resetting the integration value, a calculation of another integration value related to an electric current flowing into the discharge load with respect to the second voltage pulse.

9. The pulse discharge power supply as set forth in claim 8, further comprising:

an electric current detector circuit configured to detect an electric current flowing into the discharge load with respect to the first voltage pulse; and a delay circuit configured to, based on receipt of the integration preparation instruction, generate an integration commencement instruction to start a calculation of said another integration value, wherein the integrator circuit is configured to receive the integration commencement instruction after the integrator circuit resets an integration value in response to receiving the integration preparation instruction and after the electric current detector circuit performs detection for a predetermined time-duration, and starts a calculation of said another integration value.

10. The pulse discharge power supply as set forth in claim 8, further comprising:

a voltage detector circuit configured to detect a voltage waveform produced on the discharge load with respect to the first voltage pulse, wherein the integrator circuit is configured to start a calculation of said another integration value when a voltage value of the discharge load reaches a predetermined voltage value on a rising edge of the voltage waveform or a trailing edge thereof.

11. The pulse discharge power supply as set forth in claim 1, further comprising:

a comparator circuit configured to store a criterion value, compare the criterion value with said integration value, and output a comparison result, wherein the control circuit controls an output of the second voltage pulse when the comparison result indicates that the integration value exceeds the criterion value.

12. The pulse discharge power supply as set forth in claim 1, further comprising:

a counter circuit configured to count a number of events where the control circuit performs a control on an output with respect to a voltage pulse outputted for a plurality of times; and a display configured to display a display based on a number of events counted by the counter circuit.

13. The pulse discharge power supply as set forth in claim 1, wherein the pulse generator circuit is made of a marx circuit configured to perform superposition by electrical conduction.

14. A pulse discharge generating method for generating pulse discharge by outputting a voltage pulse for a plurality of times from a pulse discharge power supply to a discharge load being a target of the pulse discharge, the pulse discharge generating method comprising:

outputting, by discharging a capacitor of a pulse generator circuit, a first voltage pulse from the pulse discharge power supply to the discharge load, the first voltage pulse being generated by superposition of a first plurality of pulses;

outputting, by discharging the capacitor of the pulse generator circuit, a second voltage pulse from the pulse discharge power supply to the discharge load after outputting the first voltage pulse, the second voltage pulse being generated by superposition of a second plurality of pulses;

calculating, by an integrator circuit, an integration value of an electric current flowing into the discharge load with respect to the first voltage pulse; and controlling, by a control circuit, an output of the second voltage pulse based on the integration value.

15. The pulse discharge generating method as set forth in claim 14, wherein the discharge load is a discharge load device, the control circuit is different than the pulse generator circuit, and the method further comprises:

supplying, by the pulse discharge power supply, voltage pulses to the discharge load device.

16. The pulse discharge power supply as set forth in claim 1, wherein the discharge load is a discharge load device, the control circuit is different from the pulse generator circuit, and the pulse discharge power supply is configured to supply voltage pulses to the discharge load device.

\* \* \* \* \*